US012676948B2

(12) United States Patent
Yan et al.

(10) Patent No.: US 12,676,948 B2
(45) Date of Patent: Jul. 7, 2026

(54) LIGHT SOURCE DEVICE AND PROJECTION SYSTEM

(71) Applicant: HISENSE LASER DISPLAY CO., LTD., Qingdao (CN)

(72) Inventors: Ke Yan, Qingdao (CN); Yong Zhang, Qingdao (CN); Xiaoqiang Gu, Qingdao (CN)

(73) Assignee: Hisense Laser Display Co., Ltd., Qingdao (CN)

( * ) Notice: Subject to any disclaimer, the term of this patent is extended or adjusted under 35 U.S.C. 154(b) by 0 days.

(21) Appl. No.: 18/999,312

(22) Filed: Dec. 23, 2024

(65) Prior Publication Data

US 2025/0126233 A1 Apr. 17, 2025

Related U.S. Application Data

(63) Continuation of application No. PCT/CN2023/104127, filed on Jun. 29, 2023.

(30) Foreign Application Priority Data

Jun. 29, 2022 (CN) .......................... 202210756023.X
Jul. 27, 2022 (CN) .......................... 202210891564.3

(51) Int. Cl.
*H04N 9/31* (2006.01)
*G02B 5/02* (2006.01)
(Continued)

(52) U.S. Cl.
CPC ......... *H04N 9/3161* (2013.01); *G02B 5/0294* (2013.01); *G02B 5/0816* (2013.01); *G02B 5/20* (2013.01); *G02B 2207/113* (2013.01)

(58) Field of Classification Search
CPC .. H04N 9/3158; H04N 9/3161; H04N 9/3164; H04N 9/31; G02B 5/0294;
(Continued)

(56) References Cited

U.S. PATENT DOCUMENTS 8,955,985 B2 * 2/2015 Matsubara ........... H04N 9/3161
353/94
2019/0331991 A1 * 10/2019 Ikeda ................. G03B 21/2066
2022/0171276 A1 6/2022 Pan

FOREIGN PATENT DOCUMENTS

CN 107656413 A 2/2018
CN 107885021 A 4/2018
(Continued)

OTHER PUBLICATIONS

International search report of PCT application No. PCT/CN2023/104127 issued on Aug. 10, 2023.

*Primary Examiner* — Sherrie Hsia
(74) *Attorney, Agent, or Firm* — Knobbe, Martens, Olson & Bear, LLP

(57) ABSTRACT

Provided is a light source device, including a first laser light source group, a second laser light source group, a dichroic mirror, a fluorescence converter, and an emission component. The first laser light source group emits laser light of a first waveband, and the second laser light source group emits laser light of a second waveband and laser light of a third waveband. The dichroic mirror is disposed on light-output sides of the first laser light source group and the second laser light source group, and the fluorescence converter and the emission component are respectively disposed on light-output sides of the dichroic mirror. The dichroic mirror is configured to emit laser light of various wavebands, and the fluorescence converter generates target fluorescence under the excitation of the laser light of the first waveband, and the target fluorescence is reflected by the dichroic mirror to the emission component.

19 Claims, 17 Drawing Sheets

(51) Int. Cl.
  *G02B 5/08*       (2006.01)
  *G02B 5/20*       (2006.01)
(58) Field of Classification Search
  CPC .. G02B 5/20; G02B 5/0816; G02B 2207/113;
                G03B 21/204; G03B 21/20; G03B
                    21/2066; G03B 21/2033
  USPC ....... 348/744, 756, 757; 362/84; 353/30, 37,
                    353/51, 58, 66, 77, 78, 94, 98, 99
  See application file for complete search history.

(56)                    References Cited

FOREIGN PATENT DOCUMENTS

| | | | |
|---|---|---|---|
| CN | 207676111 | U | 7/2018 |
| CN | 109375462 | A | 2/2019 |
| CN | 111367139 | A | 7/2020 |
| CN | 112114488 | A | 12/2020 |
| CN | 212905880 | U | 4/2021 |
| CN | 213182296 | U | 5/2021 |
| CN | 113050354 | A | 6/2021 |
| CN | 113777870 | A | 12/2021 |
| CN | 113900332 | A | 1/2022 |
| CN | 113900341 | A | 1/2022 |
| CN | 113934097 | A | 1/2022 |
| CN | 217739704 | U | 11/2022 |
| JP | 2015028504 | A | 2/2015 |
| JP | 2020197621 | A | 12/2020 |
| WO | 2022007679 | A | 1/2022 |

* cited by examiner

100

-------> Laser light of a first waveband
- - -> Laser light of a second waveband or laser light of a third waveband
- - -> Target fluorescence

4

········→   Laser light of a first waveband

− − →   Laser light of a second waveband or laser light of a third waveband

− · − →   Target fluorescence

100

--------→ Laser light of a first waveband
·--·-→ Laser light of a second waveband or laser light of a third waveband
-·-·-→ Target fluorescence

8

2

2

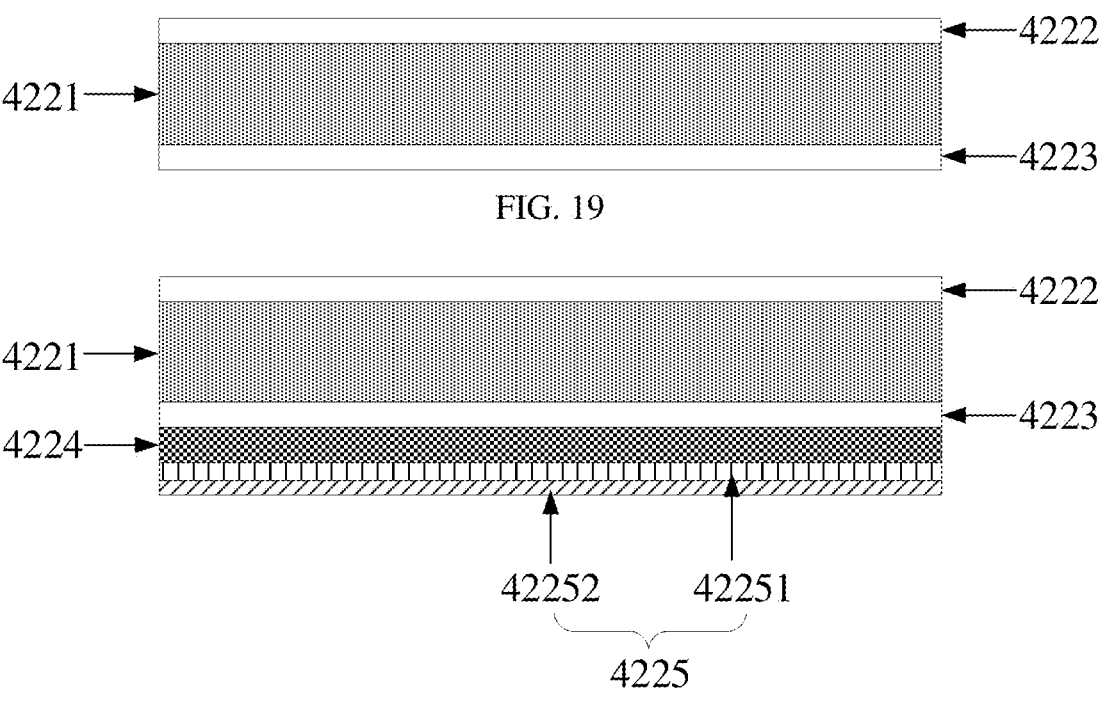
FIG. 19
FIG. 20
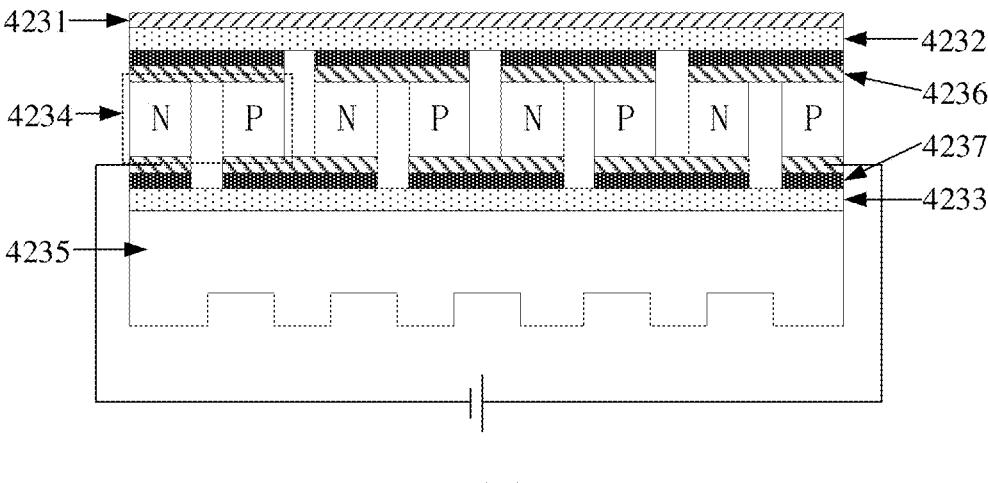
FIG. 21

100

LIGHT SOURCE DEVICE AND PROJECTION SYSTEM

This application is a continuation application of PCT application No. PCT/CN2023/104127 filed on Jun. 29, 2023, which claims priority to Chinese Patent Application No. 202210756023. X, filed on Jun. 29, 2022 and entitled "LIGHT SOURCE DEVICE AND PROJECTION SYSTEM" and Chinese Patent Application No. 202210891564.3, filed on Jul. 27, 2022 and entitled "PROJECTION LIGHT SOURCE AND PROJECTION DEVICE", the contents of which are herein incorporated by reference in their entireties.

TECHNICAL FIELD

The present disclosure relates to the field of optoelectronic technology, and in particular, relates to a light source device and a projection system.

BACKGROUND

With the development of optoelectronic technology, the requirement for the image display effect of the projection system is increasingly higher.

The light source of the projection system may be a pure laser light source or a fluorescence excitation light source made of fluorescent materials excited by a laser. As a laser can emit laser light with high purity and brightness, the laser is generally used as the light source in the projection system in the related art. The laser directly emits laser light of three colors of red, green, and blue, and the laser light of the three colors is combined and modulated to form a projection image.

SUMMARY

In an aspect of the present disclosure, a light source device is provided. The light source device includes a first laser light source group, a second laser light source group, a dichroic mirror, a fluorescence converter, and an emission component; wherein the first laser light source group includes a first laser light source, the first laser light source being configured to emit laser light of a first waveband; and the second laser light source group at least includes a second laser light source and a third laser light source, the second laser light source being configured to emit laser light of a second waveband, and the third laser light source is configured to emit laser light of a third waveband;

the dichroic mirror is disposed on light-output sides of the first laser light source group and the second laser light source group; and the fluorescence converter and the emission component are respectively disposed on a light-output side of the dichroic mirror;

the dichroic mirror is configured to emit the laser light of the first waveband, the laser light of the second waveband, and the laser light of the third waveband, and the fluorescence converter is capable of generating target fluorescence under excitation of the laser light of the first waveband, wherein the target fluorescence is reflected by the dichroic mirror to the emission component, and the target fluorescence is capable of providing fluorescence of the second waveband and fluorescence of the third waveband; and the light source device includes at least three light beams, wherein the at least three light beams are emitted from the emission component according to a time sequence, and the at least three light beams include the laser light of the first waveband which is emitted separately, the laser light of the second waveband and the fluorescence of the second waveband which are combined and emitted, and the laser light of the third waveband and the fluorescence of the third waveband which are combined and emitted.

In another aspect of the present disclosure, a projection system is provided. The projection system includes the above light source device, an optical valve modulation component, and a projection lens; wherein the optical valve modulation component is disposed on a light-output side of the light source device and is configured to modulate and emit incident light; and the projection lens is disposed on a light-emitting path of the optical valve modulation component and is configured to project an image of light emitted from the optical valve modulation component.

BRIEF DESCRIPTION OF THE DRAWINGS

For describing the technical solutions in the embodiments of the present disclosure more clearly, the following briefly describes the accompanying drawings required for describing the embodiments. Apparently, the accompanying drawings in the following description show merely some embodiments of the present disclosure, and those of ordinary skill in the art may still derive other drawings from these accompanying drawings without creative efforts.

FIG. 19 is a schematic diagram of a cross-sectional structure of another exemplary fluorescence conversion component according to some embodiments of the present disclosure;

FIG. 20 is another schematic diagram of a cross-sectional structure of another exemplary fluorescence conversion component according to some embodiments of the present disclosure;

FIG. 21 is a schematic structural diagram of a heat dissipation component according to some embodiments of the present disclosure;

Figure 1:
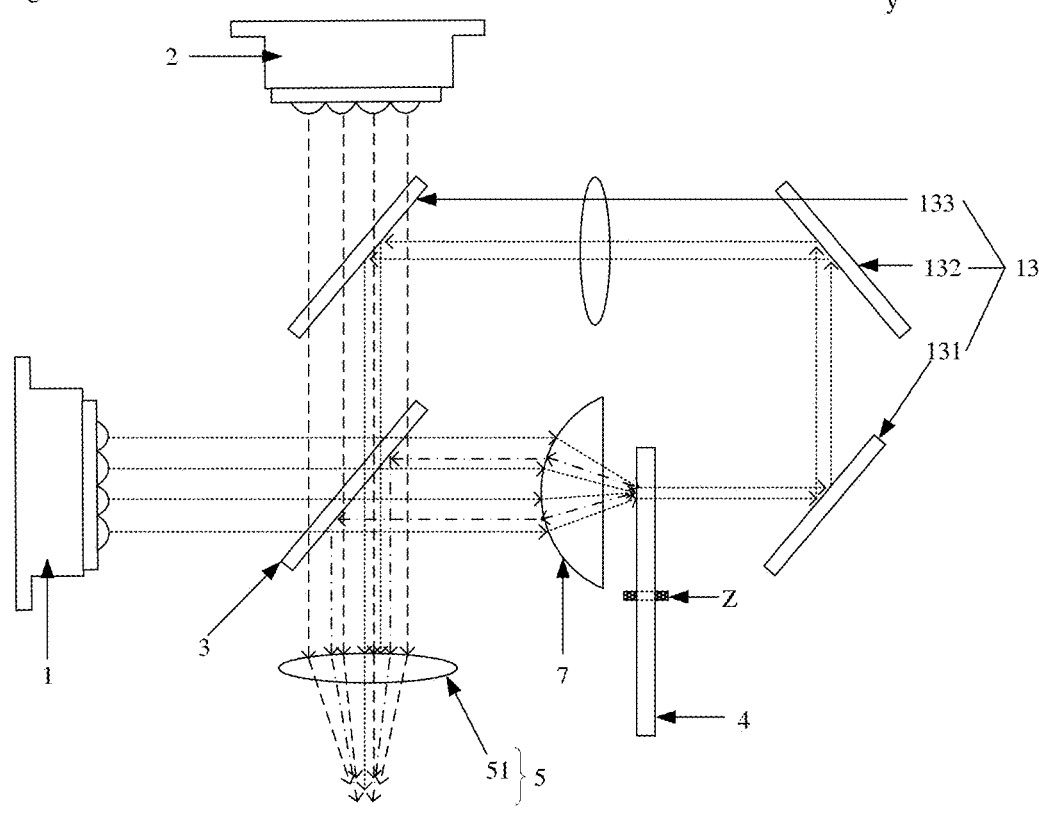
FIG. 1 is a schematic structural diagram of a first exemplary light source device according to some embodiments of the present disclosure.

Reference numerals in the accompanying drawings: 100—light source device; 1—first laser light source group; 2—second laser light source group; 21—light-emitting chip; 22—heat sink; 23—reflecting prism; 24—conductive pin; 3—dichroic mirror; 311—a first region; 312—second region; 321—first portion; 322—second portion; 323—third portion; 324—fourth portion; 4—fluorescence converter; 411—fluorescence conversion region; 412—laser emission region; 413—light selection layer; 421—dynamic optical component; 4211—reflective portion; 4212—transmission portion; 42121—first light filter portion; 42122—second light filter portion; 422—fluorescence conversion component; 4221—fluorescence conversion layer; 4222—anti-reflection layer; 4223—reflection layer; 4224—heat conduction layer; 4225—connection layer; 42251—solder mask layer; 42252—first welding layer; 423—heat dissipation component; 4231—second welding layer; 4232—first heat-conducting sheet; 4233—second heat-conducting sheet; 4234—semiconductor thermocouple; 4235—heat dissipater; 4236—metal conductor; 4237—bonding portion; 5—emission component; 51—exit lens; 6—first collimating lens; 7—focusing lens; 8—color filter wheel; 81—first light filter region; 82—second light filter region; 83—transmission region; 9—first beam homogenizer; 10—second beam homogenizer; 11—first reflector; 12—second reflector; 13—light path adjusting lens group; 131—first mirror; 132—second mirror; 133—third mirror; 14—second collimating lens; 20—homogenizing component; 16—first diffusion sheet; 17—second diffusion sheet; 18—beam-shrinking lens group; 19—light-combining lens group; 200—optical valve modulation component; 300—projection lens.

DETAILED DESCRIPTION

In order to make the foregoing objectives, features, and advantages of the present disclosure more apparent and understandable, the present disclosure will be further described below in combination with the accompanying drawings and embodiments. However, the example embodiments may be implemented in a variety of forms and should not be construed as being limited to the embodiments set forth herein. Rather, these embodiments are provided to make the present disclosure more comprehensive and complete and to comprehensively convey the concepts of the example embodiments to those skilled in the art. The same reference numerals in the drawings indicate the same or similar structures, and thus repetitive descriptions are omitted. The words describing position and orientation in the present disclosure are illustrated taking the accompanying drawings as an example, and changes may be made as required, and the changes are all included in the scope of protection of the present disclosure. The accompanying drawings of the present disclosure are merely used to illustrate the relative positional relationship but do not represent the true scale.

With the development of optoelectronic technology, a laser is widely used as a light source in a projection device to provide laser light for forming a projection image. At present, the requirement for the image display effect of the projection system is increasingly higher. In the related art, as the laser light emitted from the laser has high coherence, the projection image generated where the laser is used as the light source device is more prone to have a speckle effect, resulting in granular bright and dark spots on the projection image, and the display effect of the projection image is poor.

The following embodiments of the present disclosure provide a light source device and a projection system. The light provided by this light source device has weak coherence, and the speckle effect of the projection image generated by the light provided by this light source device can be weakened, thereby improving the display effect of the projection image.

Figure 17:
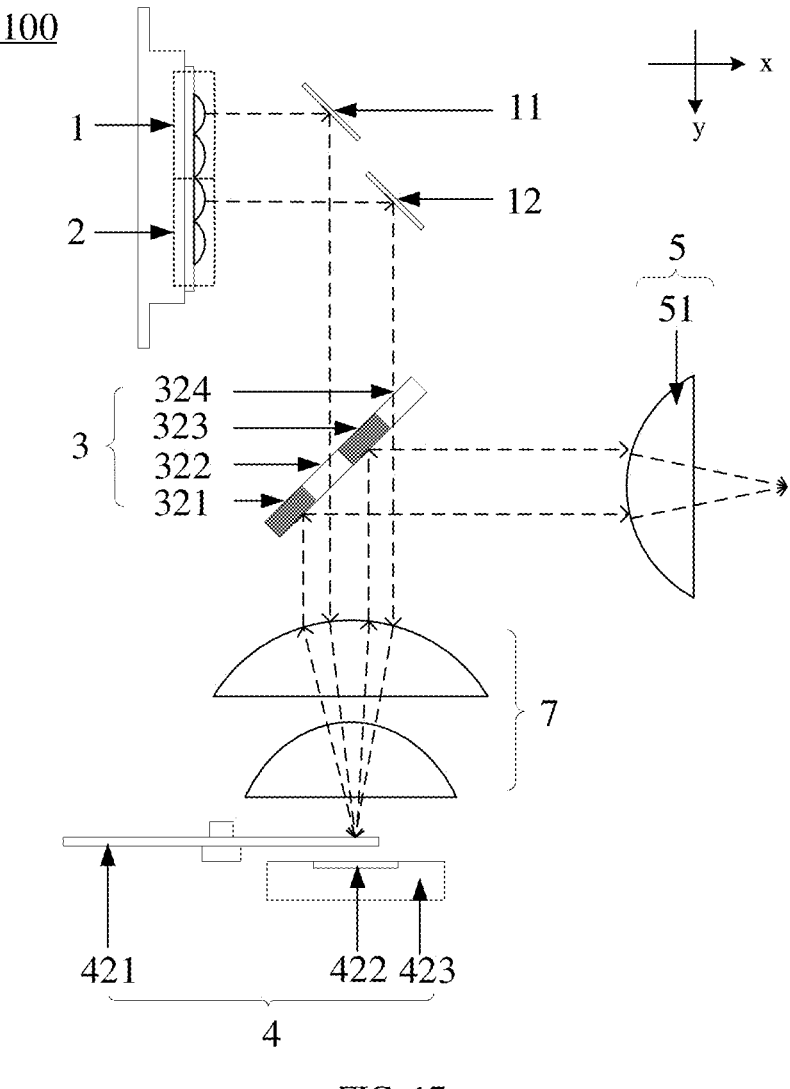
FIG. 17 is a schematic structural diagram of a ninth exemplary light source device according to some embodiments of the present disclosure.

As shown in FIG. 1 or FIG. 17, the light source device 100 provided in the embodiments of the present disclosure includes a first laser light source group 1, a second laser light source group 2, a dichroic mirror 3, a fluorescence converter 4, and an emission component 5.

The first laser light source group 1 includes a first laser light source, and the first laser light source is configured to emit laser light of a first waveband. The second laser light source group 2 at least includes a second laser light source and a third laser light source, the second laser light source is configured to emit laser light of a second waveband, and the third laser light source is configured to emit laser light of a third waveband.

The dichroic mirror 3 is disposed on the light-output sides of the first laser light source group 1 and the second laser light source group 2, and the fluorescence converter 4 and the emission component 5 are disposed on the light-output side of the dichroic mirror 3. For example, the fluorescence converter 4 and the emission component 5 are disposed at different positions of the light-output side of the dichroic mirror 3, respectively.

The dichroic mirror 3 is configured to emit laser light of the first waveband, laser light of the second waveband, and laser light of the third waveband. The fluorescence converter 4 is capable of providing target fluorescence under the excitation of the laser light of the first waveband, and the target fluorescence is reflected by the dichroic mirror 3 to the emission component 5. The target fluorescence includes fluorescence of the second waveband and fluorescence of the third waveband.

The light source device 100 includes at least three light beams. The at least three light beams are emitted from the emission component 5 according to a time sequence, and the at least three light beams include the laser light of the first waveband which is emitted separately, the laser light of the second waveband and the fluorescence of the second waveband which are combined and emitted, and the laser light of the third waveband and the fluorescence of the third waveband which are combined and emitted.

The first laser light source group 1 is configured to emit laser light of the first waveband, and the laser light of the first waveband can be incident to the dichroic mirror 3. The second laser light source group 2 is configured to emit laser light of a plurality of colors, which includes the laser light of the second waveband and the laser light of the third waveband. Furthermore, the laser light of the plurality of colors emitted from the second laser light source group 2 may include a plurality of laser light different from the laser light of the first waveband to the third waveband as described above.

For example, the laser light of the first waveband is blue laser light because blue laser light has higher energy and higher fluorescence excitation efficiency, the laser light of the second waveband is red laser light, and the laser light of the third waveband is green laser light.

It is not excluded that the laser light of the plurality of colors emitted from the second laser light source group 2 may further include blue laser light, and the blue laser light emitted from the second laser light source group 2 has a different central wavelength from the blue laser light emitted from the first laser light source group 1.

In the case that the laser light emitted from the second laser light source group 2 includes blue laser light, the blue laser light may have a different central wavelength from the blue laser light emitted from the first laser light source group 1. It is to be noted that laser light emitted from the same laser is not all of the expected wavelengths, but may be of wavelengths having a certain error with a certain expected wavelength, the laser light emitted from the laser may include laser light of a plurality of wavelengths within a small wavelength range, and the central wavelength of the laser light refers to the median of wavelengths in the wavelength range.

Exemplarily, the central wavelength of the blue laser emitted from the second laser light source group 2 is 465 nanometers. Laser light of this central wavelength is more compatible with the specified image high-definition standard, and display images generated by this laser light have higher definition. The blue laser light emitted from the first laser light source group 1 has a central wavelength of 455 nanometers, and the blue laser light of this central wavelength has higher fluorescence excitation efficiency. Exemplarily, the blue laser light emitted from the second laser light source group 2 also has a central wavelength of 455 nanometers, and the blue laser light emitted from the first laser light source group 1 has a central wavelength of 465 nanometers, which is not limited in the embodiments of the present disclosure.

In the embodiments of the present disclosure, based on the dichroism, the dichroic mirror 3 is capable of transmitting the laser light of the first waveband emitted from the first laser light source group 1 and the laser light of the second waveband and the laser light of the third waveband emitted from the second laser light source group 2, and is capable of reflecting the fluorescence emitted from the fluorescence converter 4.

In some cases, the dichroic mirror 3 is further capable of transmitting or reflecting laser light of the first waveband from the fluorescence converter 4, and further reflecting laser light of the second waveband and laser light of the third waveband from the fluorescence converter 4. This function of the dichroic mirror 3 is adaptively designed for transmitting and reflecting light of different wavebands at different positions of the dichroic mirror 3.

In the embodiments of the present disclosure, the fluorescence is excited by the laser light of the first waveband (e.g., blue laser light) based on the fluorescence converter 4.

In an example, the target fluorescence generated by the fluorescence converter 4 includes the fluorescence of the second waveband and the fluorescence of the third waveband, and the fluorescence of the second waveband or the fluorescence of the third waveband and the corresponding laser light are combined by the emission component 5 and emitted from the emission component 5. Based on this example, referring to FIG. 1, the emission component 5 is an exit lens 51.

In another example, the target fluorescence generated by the fluorescence converter 4 includes the fluorescence of a fourth waveband, e.g., yellow fluorescence, and the fluorescence of the fourth waveband is processed, e.g., filtered, to obtain the fluorescence of the second waveband and the fluorescence of the third waveband. Based on this example, referring to FIG. 8, the emission component 5 is a combination of an exit lens 51 and a color filter wheel 8. The target fluorescence from the exit lens 51 is filtered by the color filter wheel 8 into the fluorescence of the second waveband or the fluorescence of the third waveband, which is then combined with the corresponding laser light by the color filter wheel 8 and emitted from the color filter wheel 8.

In the light source device 100 provided in the embodiments of the present disclosure, as the first laser light source group 1 provides the laser light of the first waveband with higher energy, the fluorescence converter 4 can be excited to provide the target fluorescence, such that the light source device has higher fluorescence excitation efficiency. The target fluorescence may be the fluorescence of the second waveband or fluorescence of the third waveband, or may be processed to form the fluorescence of the second waveband or the fluorescence of the third waveband. The light source device 100 includes at least three light beams, including the laser light of the first waveband which is emitted separately, the laser light of the second waveband and the fluorescence of the second waveband which are combined and emitted, and the laser light of the third waveband and the fluorescence of the third waveband which are combined and emitted. On the one hand, the projection image has the advantages of higher luminance, higher color saturation, and the like. On the other hand, as the fluorescence has no incoherence, mixing fluorescence of the same color system with the laser light to form the projection image can weaken the overall light coherence in the projection image, thereby weakening the speckle effect of the projection image. Both of the above can effectively improve the display effect of the projection image.

The light source device 100 provided in the embodiments of the present disclosure may be designed to include a plurality of light-output paths, and two exemplary light-output paths are described below in combination with FIG. 1 and FIG. 17, respectively.

As shown in FIG. 1, the light source device 100 includes a first light-output path, which includes the following.

For the light beam of the laser light of the first waveband which is emitted separately, the laser light of the first waveband is emitted via the dichroic mirror 3, the fluorescence converter 4, the dichroic mirror 3, and the emission component 5. For example, the emission component 5 is the exit lens 51, and the laser light of the first waveband is blue laser light, that is, the light-output path of the blue laser light emitted from the first laser light source group 1 is from the first laser light source group 1 to the dichroic mirror 3 to the fluorescence converter 4 to the dichroic mirror 3 to the exit lens 51.

For the light beam of the laser light of the second waveband and the fluorescence of the second waveband which are combined and emitted, the laser light of the second waveband passes through the dichroic mirror 3 and the emission component 5, and is combined with the fluorescent light of the second waveband at the emission component 5 and then is emitted from the emission component 5.

For example, the emission component 5 is the exit lens 51, the laser light of the second waveband is red laser light, and the fluorescence of the second waveband is red fluorescence. That is, the blue laser light emitted from the first laser light source group 1 is transmitted through the dichroic mirror 3 to the fluorescence converter 4 to excite the red fluorescence, and the red fluorescence is reflected by the dichroic mirror 3 to the exit lens 51. The red laser light emitted from the second laser light source group 2 is transmitted through the dichroic mirror 3 to the exit lens 51. In this way, the red fluorescence and the red laser light converge at the exit lens 51 and then are emitted from the exit lens 51.

For the light beam of the laser light of the third waveband and the fluorescence of the third waveband which are combined and emitted, the laser light of the third waveband passes through the dichroic mirror 3 and the emission component 5, and is combined with the fluorescent light of the third waveband at the emission component 5 and then is emitted from the emission component 5.

For example, the emission component 5 is the exit lens 51, the laser light of the third waveband is green laser light, and the fluorescence of the third waveband is green fluorescence. That is, the blue laser light emitted from the first laser light source group 1 is transmitted to the fluorescence converter 4 through the dichroic mirror 3 to excite the green fluorescence, and the green fluorescence is reflected by the dichroic mirror 3 to the exit lens 51. The green laser light emitted from the second laser light source group 2 is transmitted to the exit lens 51 through the dichroic mirror 3. In this way, the green fluorescence and the green laser light converge at the exit lens 51 and then are emitted from the exit lens 51.

As shown in FIG. 17, the light source device 100 includes a second light-output path, which includes the following.

For the light beam of the laser light of the first waveband which is emitted separately, the laser light of the first waveband is emitted via the dichroic mirror 3, the fluorescence converter 4, the dichroic mirror 3, and the emission component 5. For example, the emission component 5 is the exit lens 51, and the laser light of the first waveband is blue laser light, that is, the light-output path of the blue laser light emitted from the first laser light source group 1 is from the first laser light source group 1 to the dichroic mirror 3 to the fluorescence converter 4 to the dichroic mirror 3 to the exit lens 51.

For the light beam of the laser light of the second waveband and the fluorescence of the second waveband which are combined and emitted, the laser light of the second waveband passes through the dichroic mirror 3, the fluorescence converter 4, the dichroic mirror 3, and the emission component 5, and is combined with the fluorescent light of the second waveband at the emission component 5 and then is emitted from the emission component 5.

For example, the emission component 5 is the exit lens 51, the laser light of the second waveband is red laser light, and the fluorescence of the second waveband is red fluorescence. That is, the blue laser light emitted from the first laser light source group 1 is transmitted through the dichroic mirror 3 to the fluorescence converter 4 to excite the red fluorescence, and the red fluorescence is reflected by the dichroic mirror 3 to the exit lens 51. The red laser light emitted from the second laser light source group 2 is transmitted through the dichroic mirror 3 and is reflected again by the fluorescence converter 4 to the dichroic mirror 3, and the dichroic mirror 3 reflects the red laser light to the exit lens 51. In this way, the red fluorescence and the red laser light converge at the exit lens 51 and then are emitted from the exit lens 51.

For the light beam of the laser light of the third waveband and the fluorescence of the third waveband which are combined and emitted, the laser light of the third waveband passes through the dichroic mirror 3, the fluorescence converter 4, the dichroic mirror 3, and the emission component 5, and is combined with the fluorescent light of the third waveband at the emission component 5 and then is emitted from the emission component 5.

For example, the emission component 5 is the exit lens 51, the laser light of the third waveband is green laser light, and the fluorescence of the third waveband is green fluorescence. That is, the blue laser light emitted from the first laser light source group 1 is transmitted through the dichroic mirror 3 to the fluorescence converter 4 to excite the green fluorescence, and the green fluorescence is reflected by the dichroic mirror 3 to the exit lens 51. The green laser light emitted from the second laser light source group 2 is transmitted through the dichroic mirror 3 to the fluorescence converter 4 and is reflected again to the dichroic mirror 3, and the dichroic mirror 3 reflects the green laser light to the exit lens 51. In this way, the green fluorescence and the green laser light converge at the exit lens 51 and then are emitted from the exit lens 51.

Based on the above light-output paths of the light source device 100 in the embodiments of the present disclosure, the structures and arrangements of some applicable fluorescence converters 4 are elaborated in the embodiments of the present disclosure.

In some implementations, the fluorescence converter 4 is a fluorescent wheel, and the fluorescent wheel includes a fluorescence conversion region 411 and a laser emission region 412. The fluorescence conversion region 411 is configured to emit the target fluorescence under the excitation of the received laser light of the first waveband, and the laser emission region 412 is configured to receive the laser light of the first waveband and emit the laser light of the first waveband in a transmission mode or a reflection mode.

For example, the laser light of the first waveband is blue laser light. Referring to FIG. 1, when the fluorescence converter 4 is only configured to receive the laser light of the first waveband and not required to receive laser light of other wavebands, the fluorescence converter 4 in the form of a fluorescent wheel is adopted, which can simplify the structural arrangement of the light source device 100 and make the operation of the light source device 100 convenient and efficient.

Figure 27:
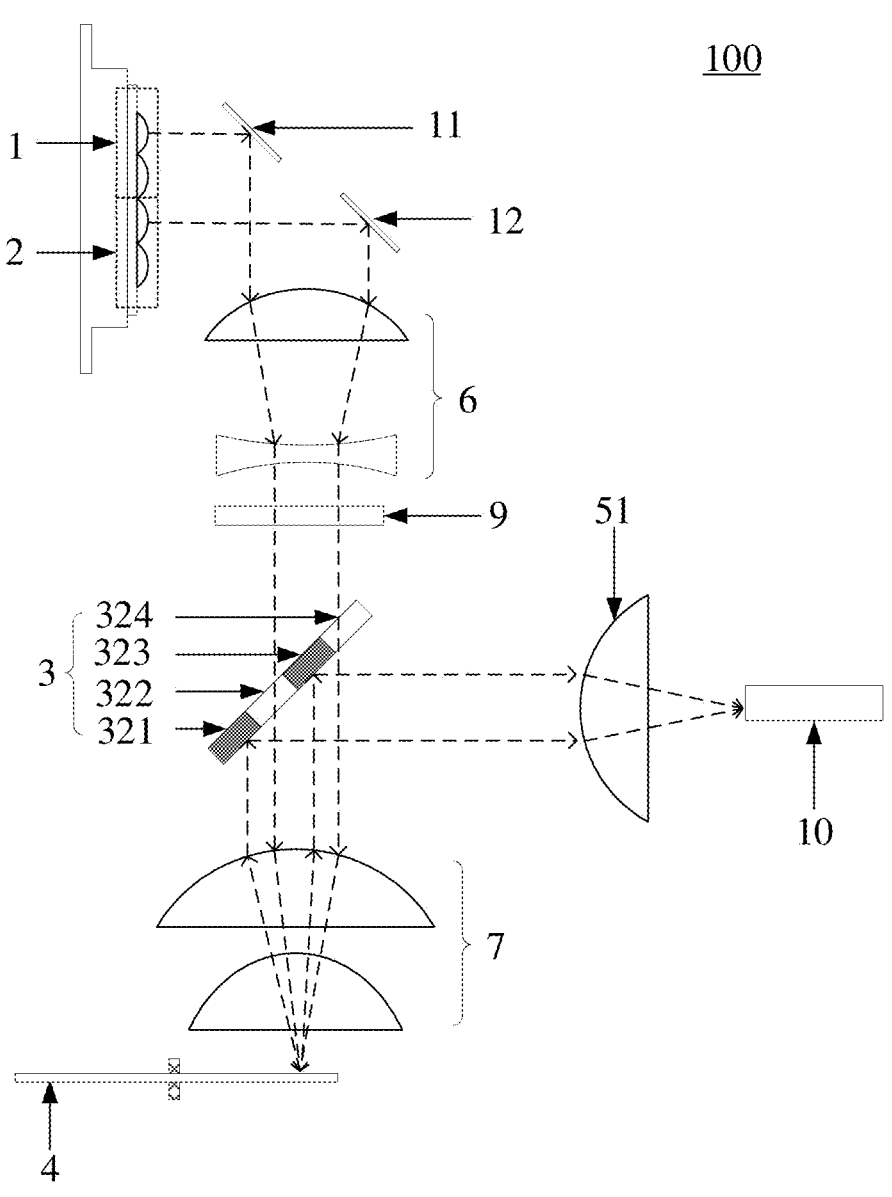
FIG. 27 is a schematic structural diagram of a thirteenth exemplary light source device according to some embodiments of the present disclosure
Figure 28:
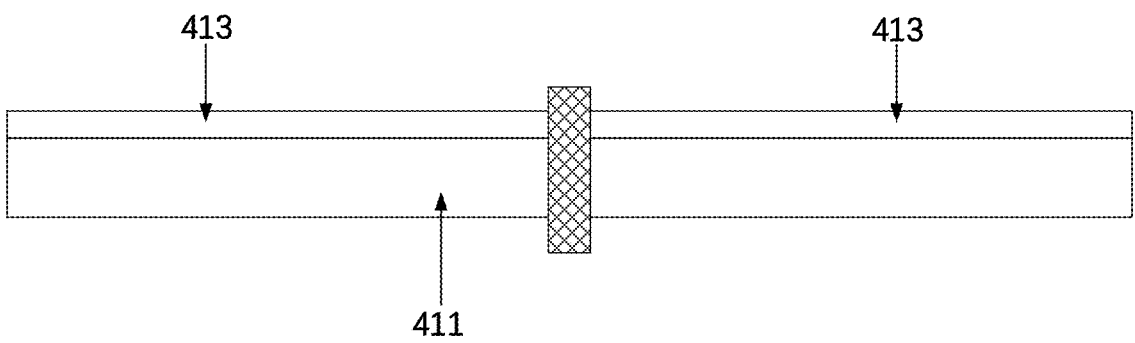
FIG. 28 is a schematic structural diagram of another exemplary fluorescence converter according to some embodiments of the present disclosure.

In some other implementations, referring to FIG. 27 and FIG. 28, the fluorescence converter 4 includes a fluorescent wheel and a light selection layer 413. The fluorescent wheel includes a fluorescence conversion region 411 and a laser emission region 412. The fluorescence conversion region 411 is configured to emit the target fluorescence under the excitation of the received laser light of the first waveband, and the laser emission region 412 is configured to receive the laser light of the first waveband and to emit the laser light of the first waveband in a transmission mode or a reflection mode. The light selection layer 413 is disposed on the surface of the fluorescent wheel facing the dichroic mirror 3, and the light selection layer 413 meets the conditions of transmitting the laser light of the first waveband and the target fluorescence, and reflecting the laser light of the second waveband and the laser light of the third waveband.

In fact, the laser light occupies a narrower waveband and the fluorescence occupies a wider waveband. Therefore, for the laser light and the fluorescence of the same color system, e.g., the red laser light and the red fluorescence, the red laser light only occupies a narrower first portion of the second waveband, and the red fluorescence occupies a wider second portion of the second waveband, and the second portion may overlap the first portion. In this way, the trans-reflection properties of light selection layer 413 are designed based on the actual wavebands of the laser light and the fluorescence of the same color system, such that the light selection layer 413 meets the following conditions of transmitting the laser light of the first waveband, the fluorescence of the second waveband, the fluorescence of the third waveband, and the fluorescence of the fourth waveband described above, and reflecting the laser light of the second waveband and the laser light of the third waveband.

For example, in the case that the first waveband is a blue waveband, the second waveband is a red waveband, and the third waveband is a green waveband, when the red laser light and the blue laser light are both incident to the fluorescence converter 4, the red laser light is reflected by the light selection layer 413, and the red laser light does not enter the fluorescent wheel and is reflected by the fluorescence converter 4 to the dichroic mirror 3. In this case, the blue laser light is transmitted by the light selection layer 413 to the fluorescence conversion region 411 of the fluorescent wheel to generate red fluorescence. The red fluorescence is transmitted from the light selection layer 413 to the dichroic mirror 3, and the dichroic mirror 3 reflects the red laser light and the red fluorescence together to the exit lens 51, thereby achieving the light combination and emission of the red laser light and the red fluorescence.

It can be seen that when the fluorescence converter 4 is configured to receive both the blue laser light and laser light of various other colors, the fluorescence converter 4 including the fluorescent wheel and the light selection layer 413 may be adopted, so as to take advantage of the light selection layer 413's properties of transmitting the blue laser light and the fluorescence and reflecting laser light other than the blue laser light to achieve the selection of the transmitted light.

Both of the above implementations of the fluorescence converter 4 involve fluorescent wheels, and the fluorescent wheels may have the same structure. The structure and function of the fluorescent wheel are described hereinafter by way of an example in which the laser light of the first waveband is blue laser light.

The fluorescent wheel includes a fluorescence conversion region 411 and a laser emission region 412. The fluorescence conversion region 411 is provided with a fluorescent material, and the fluorescent material emits fluorescence of the same color as the fluorescent material under the irradiation of excitation light. The color of the fluorescent material in a wave band that is not the first waveband, e.g., not blue.

For example, the fluorescent material includes a yellow fluorescent material, and may be excited by the blue laser light to emit yellow fluorescence. Alternatively, the fluorescent material includes both a red fluorescent material and a green fluorescent material, and may be excited by the blue laser light to emit red fluorescence and green fluorescence. Alternatively, the fluorescent material may also include fluorescent materials of other colors.

The laser emission region 412 is a transmission region for transmitting the received laser light. Alternatively, the laser emission region 412 is a reflective region for reflecting the received laser light.

When the laser emission region 412 of the fluorescence converter 4 is configured to receive the blue laser light only but not receive laser light of a plurality of other colors, the laser emission region 412 is configured to transmit or reflect the blue laser light only. When the laser emission region 412 of the fluorescence converter 4 is configured to receive the blue laser light and laser light of a plurality of other colors, the laser emission region 412 is configured to transmit or reflect both the blue laser light and the laser light of the plurality of other colors. In this case, the laser emission region 412 includes a blue laser emission region, a red laser emission region, a green laser emission region, and the like.

The fluorescence converter 4 is configured to rotate, such as rotate around a rotation shaft Z, which passes through its center axis. During rotation, the fluorescence conversion region 411 and the laser emission region 412 of the fluorescence converter 4 receive the blue laser light according to a time sequence.

Figure 2:
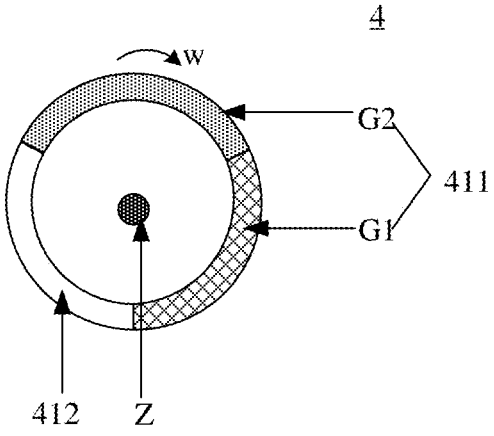
FIG. 2 is a schematic structural diagram of an exemplary fluorescence converter in the form of a fluorescent wheel according to some embodiments of the present disclosure.

FIG. 2 is a schematic structural diagram of a fluorescent wheel according to some embodiments of the present disclosure, and FIG. 2 shows the left view of the fluorescent wheel in FIG. 1. In combination with FIG. 1 and FIG. 2, the structure of the fluorescence converter 4 is illustrated by way of example in which the fluorescence converter 4 receives blue laser light only.

The fluorescence converter 4 rotates around the rotation shaft Z along a w direction or along an opposite direction of the w direction, such that the blue laser light received by the fluorescence converter 4 is switched between the fluorescence conversion region 411 and the laser emission region 412. For example, the fluorescence converter 4 rotates under the driving of a motor. Exemplarily, the fluorescence converter 4 is in the shape of a circle or a circular ring, the fluorescence conversion region 411 and the laser emission region 412 of the fluorescence converter 4 are in the shape of a fan or a fan ring, and the embodiments of the present disclosure are illustrated taking the fluorescence converter 4 being in the shape of a circular circle as an example. The ring surface of the circular ring intersects the first direction (x-direction), the rotation shaft Z is parallel to the x-direction, and the rotation shaft Z passes through the center of the circular ring and is perpendicular to the ring surface of the circular ring. Exemplarily, the fluorescence conversion region 411 of the fluorescence converter 4 includes a reflective substrate, and a fluorescent material (e.g., fluorescent powder) is provided on the reflective substrate. The fluorescence emitted from the fluorescent material under the excitation of the blue laser light is reflected by the reflective substrate and emitted to the focusing lens 7.

In the embodiments of the present disclosure, the fluorescence conversion region 411 and the laser emission region 412 of the fluorescence converter 4 are two contiguous regions independent of each other. The fluorescence conversion region 411 is contiguous and is provided with only one fluorescent material, e.g., yellow fluorescent material. Alternatively, the fluorescence conversion region 411 includes a plurality of sub-regions, and different fluorescent materials are provided in the different sub-regions. As shown in FIG. 2, the fluorescence conversion region 411 includes adjacent sub-regions G1 and G2. Exemplarily, one of the two sub-regions is provided with a red fluorescent material for being excited to emit red fluorescence, and the other sub-region is provided with a green fluorescent material for being excited to emit green fluorescence. Exemplarily, the sub-region G1, the sub-region G2, and the laser emission region 412 have an equal area.

In some examples, the fluorescence conversion region 411 and the laser emission region 412 of the fluorescence converter 4 both include a plurality of sub-regions, and the sub-regions of the fluorescence conversion region 411 and the sub-regions of the laser emission region 412 are disposed at intervals. Exemplarily, the different sub-regions of the fluorescence conversion region 411 are provided with different fluorescent materials, or there are sub-regions provided with the same fluorescent material. For example, the fluorescence converter 4 includes six sub-regions sequentially arranged along the circumferential direction, with three sub-regions belonging to the fluorescence conversion region 411 and the other three sub-regions belonging to the laser emission region 412. Each sub-region of the fluorescence conversion region 411 is provided with a yellow fluorescent material. One sub-region belonging to the laser emission region 412 exists between every two adjacent sub-regions belonging to the fluorescence conversion region 411, and one sub-region belonging to the fluorescence conversion region 411 exists between every two adjacent sub-regions belonging to the laser emission region 412. For another example, the fluorescence converter 4 includes six sub-regions sequentially arranged along the circumferential direction, with four sub-regions belonging to the fluorescence conversion region 411 and two sub-regions belonging to the laser emission region 412. Two of the four sub-regions are provided with red fluorescent materials, the other two of the four sub-regions are provided with green fluorescent materials, and two opposite sub-regions are provided with the same fluorescent material.

The way of dividing the sub-regions in the fluorescence converter 4, the area of each of the sub-regions, and the fluorescent materials provided in the sub-regions belonging to the fluorescence conversion region 411 are not limited in the embodiments of the present disclosure. The fluorescent materials provided in the sub-regions belonging to the fluorescence conversion region 411 are determined based on the color components for forming the projection image, and the area of each of the sub-regions of the fluorescence conversion region 411 and the area of the laser emission region 412 are determined based on the proportion of the light emitted therefrom to the light required to be obtained.

The structure and function of the fluorescence converter 4 including a fluorescent wheel have been described above, and the structure and function of another improved the fluorescence converter 4 are described below.

As shown in FIG. 17, the fluorescence converter 4 includes a dynamic optical component 421, a fluorescence conversion component 422, and a heat dissipation component 423. The dynamic optical component 421 includes a reflection portion 4211 and a transmission portion 4212 that are dynamically switchable. The reflection portion 4211 is configured to reflect the laser light of the first waveband, and the transmission portion 4212 is configured to transmit light which at least includes the laser light of the first waveband, the laser light of the second waveband, and the laser light of the third waveband. The fluorescence conversion component 422 is disposed on the light-output side of the dynamic optical component 421, and the fluorescence conversion component 422 is configured to emit the target fluorescence under the excitation of the received laser light of the first waveband. The heat dissipation component 423 is disposed on the side of the fluorescence conversion component 422 facing away from the dynamic optical component 421, and the heat dissipation component 423 is configured to dissipate heat from the fluorescence conversion component 422.

The fluorescence converter 4 is a fixed fluorescence conversion component and is fixedly arranged in the light source device 100, which can substantially improve the reliability of the light source device 100. As the fluorescence converter 4 has no mechanical movement, the size of the structure of the light source device 100 can be reduced. Moreover, the area of the fluorescent material provided in the fluorescence converter 4 can be reduced, for example, from the annular area in the related art to a small-area square or circular area, which substantially reduces the amount of fluorescent materials used and the cost of the fluorescent materials. Additionally, there is no dynamic limitation of high-speed rotation of the fluorescence converter 4, centralized heat dissipation can be performed on the fluorescence converter 4. It can be seen that the fluorescence converter 4 in this implementation has stable optical performance and efficient output under a certain laser power, which can improve the color performance capability of the projection system.

Figure 18:
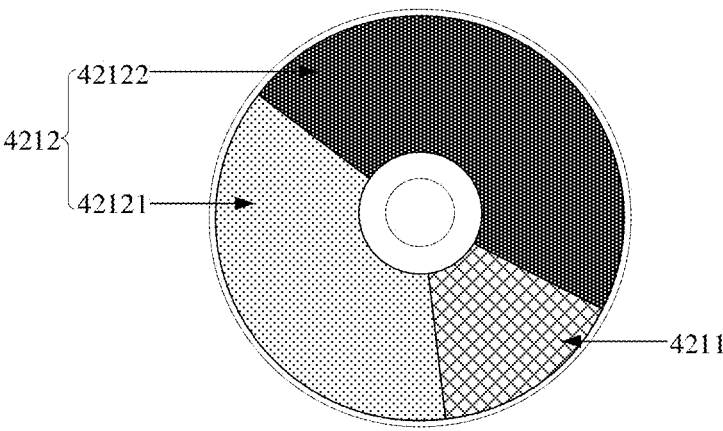
FIG. 18 is a schematic diagram of a planar structure of a dynamic optical component according to some embodiments of the present disclosure.

As shown in FIG. 18, the dynamic optical component 421 includes a reflection portion 4211 and a transmission portion 4212, and the dynamic optical component 421 can achieve the dynamic switching between the reflection portion 4211 and the transmission portion 4212 by rotation, linear reciprocation, electrical conversion transmittance, or the like. The embodiments of the present disclosure are illustrated by way of an example in which the dynamic optical component 421 is driven by rotation. In practice, the dynamic optical component 421 may be driven by different movements based on structural needs.

The dynamic optical component 421 further includes a driving element that can drive the dynamic optical component 421 to move, such that laser light can be incident to the reflection portion 4211 and the transmission portion 4212 in a time-sharing manner.

For example, when the laser light of the first waveband is incident to the reflection portion 4211, the laser light of the first waveband is reflected to the dichroic mirror 3 and is reflected by the dichroic mirror 3 in a set direction. When the laser light of the first waveband is incident to the transmission portion 4212, the laser light of the first waveband passes through the transmission portion 4212 and is incident to the fluorescence conversion component 422 to excite the fluorescence conversion component 422 to emit fluorescence, and the fluorescence emitted under excitation is reflected back to the dichroic mirror 3 and then is reflected in the set direction by the dichroic mirror 3. In this way, different colors of light can be output in the set direction according to a time sequence, thereby achieving the emission of three basic colors of light.

The fluorescence conversion component 422 is disposed on the side of the dynamic optical component 421 facing away from the dichroic mirror 3, and the fluorescence conversion component 422 is configured to emit red fluorescence, green fluorescence, or fluorescence of other colors under the excitation of the blue laser light.

FIG. 19 is a schematic diagram of a cross-sectional structure of the fluorescence conversion component according to some embodiments of the present disclosure. As shown in FIG. 19, the fluorescence conversion component 422 includes a fluorescence conversion layer 4221, an anti-reflection layer 4222, and a reflection layer 4223. The fluorescence conversion layer 4221 is configured to emit target fluorescence under the excitation of the laser light of the first waveband. The anti-reflection layer 4222 is disposed on the side of the fluorescence conversion layer 4221 facing the dynamic optical component 421, and the anti-reflection layer 4222 meets the conditions of transmitting the laser light of the first waveband and the fluorescence generated under excitation, and reflecting the laser light of the second waveband and the laser light of the third waveband. In some examples, the anti-reflection layer 4222 is further configured to anti-reflect the laser light of the first waveband. The reflection layer 4223 is disposed on the side of the fluorescence conversion layer 4221 facing away from the anti-reflection layer 4222, and the reflection layer 4223 is configured to reflect the fluorescence generated under excitation.

The fluorescence generated under excitation may be the fluorescence of the second waveband and the fluorescence of the third waveband, or maybe the fluorescence of the fourth waveband (e.g., yellow fluorescence). The fluorescence of the fourth waveband is processed to obtain the fluorescence of the second waveband and the fluorescence of the third waveband. For the design of the anti-reflection layer 4222, reference may be made to the above light selection layer 413.

The fluorescence conversion layer 4221 serves as a core film layer in the fluorescence conversion component, and is configured to emit fluorescence under the excitation of the blue laser light. The fluorescence conversion layer is made from ceramic fluorescent materials or single-crystal fluorescent materials which are formed of fluorescent ceramics sintered with YAG-based fluorescent power and ceramic materials at a high temperature through manufacturing processes of crystalline growth and the like, which is not limited herein. The fluorescence conversion layer 4221 has a thickness of 0.05 mm to 1 mm.

For example, the laser light of the first waveband is blue laser light, the laser light of the second waveband is red laser light, and the laser light of the third waveband is green laser light. The anti-reflection layer 4222 is configured to transmit the blue laser light and the fluorescence, and reflect the red laser light, the green laser light, and a plurality of other colors of laser light. Furthermore, the anti-reflection layer 4222 anti-reflects the blue laser light. Specifically, the anti-reflection layer 4222 is made to have an anti-reflection effect in the band spectral range of 420 nm to 470 nm by a film coating process, so as to increase the transmission of the blue laser light. The anti-reflection layer 4222 has a thickness of 0.5 μm to 10 μm, which is not limited herein.

The reflection layer 4223 is disposed on the side of the fluorescence conversion layer 4221 facing away from the anti-reflection layer 4222, and the reflection layer 4223 is configured to reflect red fluorescence, green fluorescence, or other colors of fluorescence. Specifically, the reflection layer 4223 may be a medium film or a metal film. The reflection layer 4223 has a thickness of 0.5 μm to 10 μm and has high reflectivity for visible light in the band spectral range of 420 nm to 680 nm. In order to ensure the reflection efficiency, the reflection layer 4223 adopts a medium film.

By providing the anti-reflection layer 4222 and the reflection layer 4223 on two sides of the fluorescence conversion layer 4221, more blue laser light can be transmitted to excite the fluorescence conversion layer 4221, and the fluorescence in a specific waveband range emitted under excitation by the fluorescence conversion layer 4221 is reflected to the dichroic mirror 3, such that more fluorescence can be utilized.

The fluorescence conversion component 422 used in the embodiments of the present disclosure is a fixed fluorescence conversion component, and the driving element in the fluorescent wheel is removed in the fixed fluorescent conversion solution, and the fluorescence conversion component is fixedly arranged in the light source device system, which can substantially improve the reliability of the system. In addition, there is no mechanical movement, and the size of the structure of the light source device can be reduced. The area of the fluorescent material is reduced from the original annular area to a small square or circular area, which substantially reduces the amount of fluorescent materials used and reduces the material cost. Additionally, there is no dynamic limitation of high-speed rotation, and centralized heat dissipation can be performed on the fixed fluorescence conversion component, which further improves the operating reliability.

As shown in FIG. 17, the light source device further includes a heat dissipation component 423. The heat dissipation component 423 is disposed on the side of the fluorescence conversion component 422 facing away from the dynamic optical component 421 and is configured to dissipate heat from the fluorescence conversion component. In a specific implementation, the heat dissipation component 423 may be a metal heat dissipation device, an air-cooling device, a liquid-cooling device, or a semiconductor refrigeration device to efficiently dissipate heat of the fluorescence conversion component 422.

FIG. 20 is another schematic diagram of a cross-sectional structure of a fluorescence conversion component 422 according to some embodiments of the present disclosure. As shown in FIG. 20, the fluorescence conversion component 422 further includes a heat conduction layer 4224 and a connection layer 4225. The heat conduction layer 4224 is disposed on the side of the reflection layer 4223 facing away from the fluorescence conversion layer 4221, and the connection layer 4225 is disposed on the side of the heat conduction layer 4224 facing away from the reflection layer 4223, and the connection layer 4225 is configured to be connected to the heat dissipation component 423.

The heat conduction layer 4224 is disposed on the side of the reflection layer 4223 facing away from the fluorescence conversion layer 4221. The heat conduction layer 4224 is provided on the surface of the reflection layer 4223 to rapidly conduct the heat generated at the laser excitation point to the entire fluorescence conversion layer sheet, thereby increasing the heat dissipation capability. The heat conduction layer 4224 may be a metal layer having a high thermal conductivity efficiency, including a high thermal conductivity metal material layer such as a copper layer or a gold layer, with a thickness of 0.1 μm to 1,000 μm. In view of the cost, the copper layer may be used, and the thickness of the copper layer is 10 μm to 200 μm, which is not limited herein.

The connection layer 4225 is disposed on the side of the heat conduction layer 4224 facing away from the reflection layer 4223, and the connection layer 4225 is configured to be connected to the heat dissipation component 423. For different connection manners between the fluorescence conversion component 422 and the heat dissipation component 423, the connection layer 4225 may be manufactured with different materials.

In some embodiments, the connection layer 4225 is connected to the heat dissipation component 423 by thermally conductive silicone grease in a mechanical fixing manner. In some embodiments, the connection layer 4225 is connected to the heat dissipation component 423 by encapsulation through being attached to the surface of a substrate by colloid coating or mechanical fixing, by encapsulation on a bearing substrate through bonding, by encapsulation through ceramic fluorescent material sintering at high-temperature, or by welding In the embodiments of the present disclosure, the structures of the connection layer 4225 and the heat dissipation component 423 are illustrated by taking the welding manner as an example.

As shown in FIG. 20, the connection layer 4225 includes a solder mask layer 42251 and a first welding layer 42252. The solder mask layer 42251 is disposed on the side of the heat conduction layer 4224 facing away from the reflection layer 4223, and the first welding layer 42252 is disposed on the side of the solder mask layer 4225 facing away from the heat conduction layer 4224, and the first welding layer 42252 is configured to weld the heat dissipation component 423.

In the embodiments of the present disclosure, the heat conduction layer 4224 is a copper layer, and the solder mask layer 42251 is plated on the copper layer. The solder mask layer 42251 may be a metallic nickel layer or titanium layer, and a nickel layer having better thermally conductivity may be selected, and the thickness of the nickel layer ranges from 0.1 μm to 5 μm. The first welding layer 42252 is provided at the lowermost part of the fluorescence conversion component 422. The first welding layer 42252 is a weldable metal layer, and maybe a gold layer. The thickness of the first welding layer 42252 ranges from 0.1 μm to 2 μm.

FIG. 21 is a schematic structural diagram of a heat dissipation component 423 according to some embodiments of the present disclosure. The heat dissipation component

423 may be a semiconductor refrigeration device. The semiconductor refrigeration device includes a second welding layer 4231, a first heat-conducting sheet 4232, a second heat-conducting sheet 4233, a plurality of semiconductor thermocouples 4234, and a heat dissipater 4235. The second welding layer 4231 is disposed on a side close to the first welding layer 42252, and the second welding layer 4231 is configured to be welded to the first welding layer 42252. The first heat-conducting sheet 4232 is disposed on the side of the second welding layer 4231 facing away from the first welding layer 42252. The second heat-conducting sheet 4233 is disposed on the side of the first heat-conducting sheet 4232 facing away from the second welding layer 4231. The plurality of semiconductor thermocouples 4234 are disposed between the first heat-conducting sheet 4232 and the second heat-conducting sheet 4233, and the plurality of semiconductor thermocouples 4234 are connected in series with each other. The heat dissipater 4235 is disposed on the side of the second heat-conducting sheet 4233 facing away from the first heat-conducting sheet 4232.

The second welding layer 4231 is configured to be welded to the first welding layer 42252. The second welding layer 4231 may be a nickel-gold layer or a titanium-platinum-gold layer and is connected to the fluorescence conversion component 422 by welding.

The semiconductor thermocouple 4234 consists of a P-type semiconductor and an N-type semiconductor, and the embodiments of the present disclosure include a semiconductor set consisting of a plurality of thermocouples. The P-type semiconductor and the N-type semiconductor are connected by a well-conducting metal conductor 4236 into a complete series circuit. The metal conductor 4236 may be made from copper, aluminum, or other metal, and the metal conductor 4236 is made of copper in the embodiments of the present disclosure.

The first heat-conducting sheet 4232 and the second heat-conducting sheet 4233 are provided on two sides of the semiconductor thermocouple 4234, and the first heat-conducting sheet 4232 and the second heat-conducting sheet 4233 may be ceramic sheets with good insulation and heat conduction. When power is supplied, according to the semiconductor refrigeration principle, one end close to the fluorescence conversion component is the refrigeration end, and the other end is the heat release end. The heat dissipater 4235 is connected to the heat release end, which can efficiently dissipate heat from the fluorescence conversion component 422.

In the embodiments of the present disclosure, the heat-conducting sheet and the semiconductor thermocouple are mechanically fixed and attached by applying thermally conductive silicone grease, or the heat-conducting sheet and the semiconductor thermocouple are welded and assembled by plating specific regions of the heat-conducting sheet and the semiconductor thermocouple with a gold-nickel layer, which is not limited herein. The bonding portion 4237 connected between the heat-conducting sheet and the metal conductor 4236 may be made from thermally conductive silicone grease, weldable metal, or the like, which is not limited herein.

The heat dissipater 4235 may be a metal heat dissipation sheet or a heat dissipation device such as an air-cooling device and a liquid-cooling device, which is not limited herein.

The embodiments of the present disclosure are merely illustrated by way of an example in which the heat dissipation component 423 is a semiconductor refrigeration device. In specific implementations, the heat dissipation component

423 may also be an air-cooling device, a liquid-cooling device, or a metal heat dissipation device or the like, and the heat dissipation component 423 can be selected according to actual needs, which is not limited herein.

When the fluorescence converter 4 is configured to receive blue laser light only and not receive laser light of a plurality of other colors, the transmission portion 4212 of the dynamic optical component 421 is configured to transmit the blue laser light only. When the fluorescence converter 4 is configured to receive blue laser light and laser light of a plurality of other colors, the transmission portion 4212 of the dynamic optical component 421 is configured to transmit or reflect the blue laser light and the laser light of the plurality of other colors.

In combination with FIG. 17 and FIG. 18, the structure of the fluorescence converter 4 is further illustrated by way of an example in which the fluorescence converter 4 is capable of receiving blue laser light, red laser light, and green laser light.

As shown in FIG. 18, the transmission portion 4212 includes a first light filter portion 42121 and a second light filter portion 42122. The first light filter portion 42121 is configured to transmit the light of the first waveband and light of the second waveband and reflect the light of the third waveband, and the second light filter portion 42122 is configured to transmit the light of the first waveband and light of the third waveband and reflect the light of the second waveband. The first waveband includes a blue waveband, the second waveband includes a red waveband, and the third waveband includes a green waveband.

The first light filter portion 42121 is configured to transmit the light of the first waveband (blue) and the light of the second waveband (red) and reflect the light of the third waveband (green), and the second light filter portion 42122 is configured to transmit the light of the first waveband (blue) and the third waveband (green) and reflect the light of the second waveband (red). The reflection portion 4211 of the dynamic optical component 421 is configured to reflect the light of the first waveband (blue).

Figure 22:
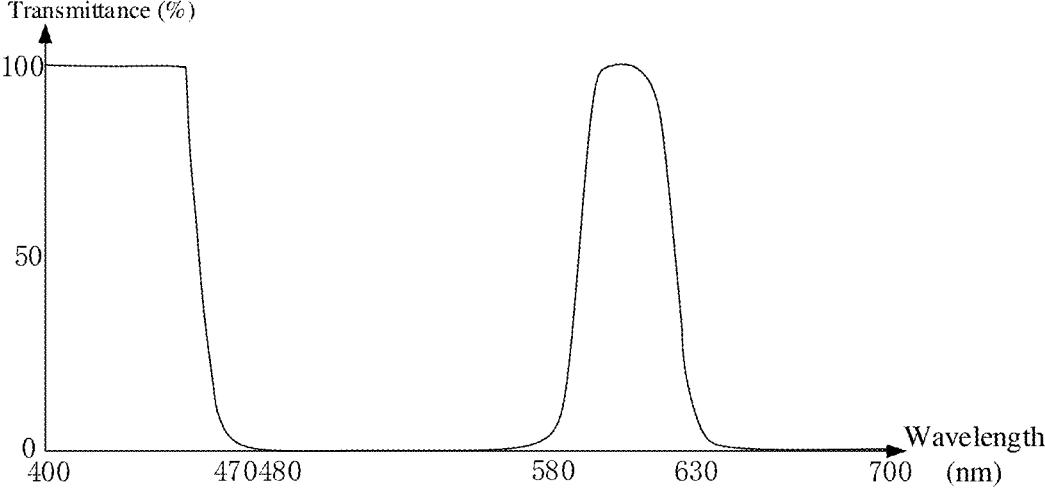
FIG. 22 is a schematic diagram of spectral transmittance of a first light filter portion according to some embodiments of the present disclosure.

The thickness of the first light filter portion 42121 ranges from 0.1 mm to 5 mm, and the first light filter portion is made to have the properties shown in FIG. 22 by film coating, i.e., transmitting light of 420 nm to 470 nm, reflecting light of 470 nm to 580 nm, transmitting light of 590 nm to 630 nm, and reflecting light of 640 nm or above, and thus the first light filter portion 42121 is configured to transmit blue light and filter out red light. In addition, by coating a plurality of films, the first light filter portion 42121 can transmit small-angle blue light and cannot transmit large-angle blue light that has been reflected.

Figure 23:
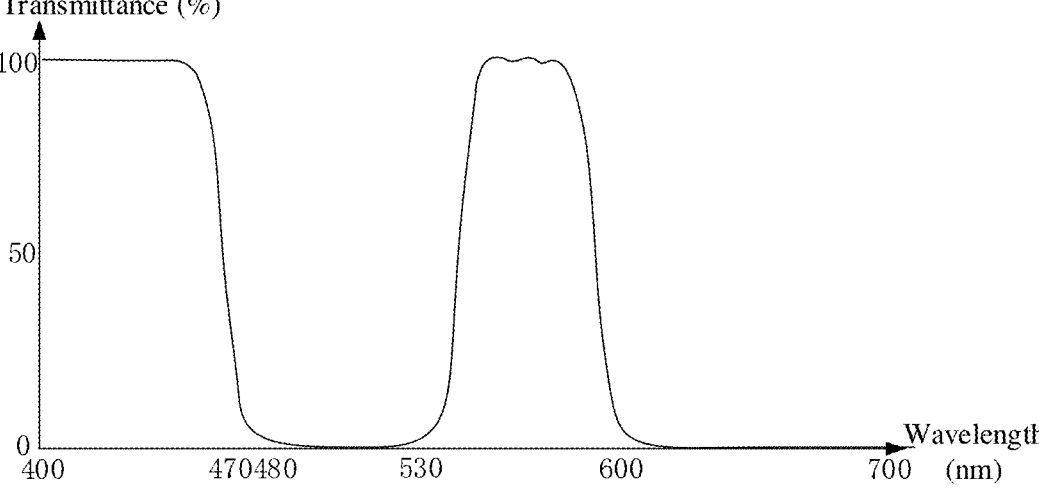
FIG. 23 is a schematic diagram of spectral transmittance of a second light filter portion according to some embodiments of the present disclosure.

The thickness of the second light filter portion 42122 ranges from 0.1 mm to 5 mm, and the second light filter portion is made to have the properties shown in FIG. 23 by film coating, i.e., transmitting light of 420 nm to 470 nm, reflecting light of 470 nm to 490 nm, transmitting light of 500 nm to 590 nm, and reflecting light of 600 nm or above, and thus the second light filter portion 42122 is configured to transmit blue light and filter out green light. Similarly, by coating a plurality of films, the second light filter portion 42122 can transmit small-angle blue light and cannot transmit large-angle blue light that has been reflected. The thickness of the reflection portion 4211 ranges from 0.1 mm to 5 mm, and by film coating, the reflection portion 4211 can reflect light of 420 nm to 470 nm, thereby reflecting blue light.

As the blue laser light is excitation light and the blue laser light has much higher energy than the fluorescence emitted under excitation, the area of the first light filter portion 42121 and the area of the second light filter portion 42122 are both greater than the area of the reflection portion 4211. Also, as the light source device 100 usually needs green light having higher energy, the area of the second light filter portion 42122 for filtering out the green light is greater than the area of the first light filter portion 42121 for filtering out the red light.

As shown in FIG. 17, when the dynamic optical component 421 is switched to the state where the reflection portion 4211 is opposite to the fluorescence conversion component 422, the first laser light source group 1 is started, and the blue laser light emitted from the first laser light source group 1 is incident into the dichroic mirror 3 (specifically, the second portion 322 of the dichroic mirror 3) after being reflected by the first reflector 11, and then irradiated onto the reflection portion 4211 of the dynamic optical component 421 after being focused by the focusing lens 7. The blue laser light incident onto the reflection portion 4211 is reflected to the dichroic mirror 3 (specifically, the third portion 323 of the dichroic mirror 3), and is emitted in the set direction after being reflected by the dichroic mirror 3.

When the dynamic optical component 421 is switched to the state where the first light filter portion 42121 is opposite to the fluorescence conversion component 422, the first laser light source group 1 and the second laser light source of the second laser light source group 2 are started simultaneously. The blue laser light emitted from the first laser light source group 1 is incident into the second portion 322 of the dichroic mirror after being reflected by the first reflector 11, and then irradiated onto the first light filter portion 42121 of the dynamic optical component 421 after being focused by the focusing lens 7. The red laser light emitted from the second laser light source group 2 is incident into the fourth portion 324 of the dichroic mirror after being reflected by the second reflector 12, and then irradiated onto the first light filter portion 42121 of the dynamic optical component 421 after being focused by the focusing lens 7.

The blue laser light passes through the first light filter portion 42121 and is irradiated onto the fluorescence conversion component 422 to excite the fluorescence conversion component 422 to emit fluorescence (e.g., yellow fluorescence), and red fluorescence is obtained after the fluorescence is reflected by the reflecting layer 4223 and filtered by the first light filter portion 42121. The red fluorescence is emitted to the dichroic mirror 3, and then the red fluorescence is reflected by the dichroic mirror 3 and emitted in the set direction. The anti-reflection layer 4222 has an anti-reflection effect on blue light and a reflection effect on red light and green light. After being reflected by the anti-reflection layer 4222, the red laser light passes through the first light filter portion 42121 and is emitted to the dichroic mirror 3, and then the red laser light is reflected by the dichroic mirror 3 and emitted together with the red fluorescence in the set direction.

When the dynamic optical component 421 is switched to the state where the second light filter portion 42122 is opposite to the fluorescence conversion component 422, the first laser light source group 1 and the third laser light source of the second laser light source group 2 are started simultaneously. The blue laser light emitted from the first laser light source group 1 is incident into the second portion 322 of the dichroic mirror after being reflected by the first reflector 11, and then irradiated onto the second light filter portion 42122 of the dynamic optical component 421 after being focused by the focusing lens 7. The green laser light emitted from the second laser light source group 2 is incident into the fourth portion 324 of the dichroic mirror after being reflected by the second reflector 12, and then irradiated onto the second light filter portion 42122 of the dynamic optical component 421 after being focused by the focusing lens 7.

The blue laser light passes through the second light filter portion 42122 and is irradiated onto the fluorescence conversion component 422 to excite the fluorescence conversion component 422 to emit fluorescence (e.g., yellow fluorescence), and green fluorescence is obtained after the fluorescence is reflected by the reflecting layer 4223 and filtered by the second light filter portion 42122. The green fluorescence is emitted to the dichroic mirror 3, and then the green fluorescence is reflected by the dichroic mirror 3 and emitted in the set direction. After being reflected by the anti-reflection layer 4222, the green laser light passes through the second light filter portion 42122 and is emitted to the dichroic mirror 3, and then the green laser light is reflected by the dichroic mirror 3 and emitted together with the red fluorescence in the set direction.

In this way, three basic colors of light are emitted chronologically for image display. In the light source device provided in the embodiments of the present disclosure, the emitted red light is a combined light of the red fluorescence and the red laser light, and the emitted green light is a combined light of the green fluorescence and the green laser light. As laser light has a large color gamut, the color performance capability of the projection system can be improved.

Hereinafter, the structures and arrangements of the first laser light source group 1 and the second laser light source group 2 in the light source device 100 provided in the embodiments of the present disclosure are exemplarily illustrated.

In some implementations, as shown in FIG. 1, the first laser light source group 1 and the second laser light source group 2 are arranged independently of each other. This arrangement is highly versatility and is applicable to both the first laser light source group 1 and the second laser light source group 2 common in the field.

In the case that the first laser light source group 1 and the second laser light source group 2 are arranged independently of each other, the light-output directions of the first laser light source group 1 and the second laser light source group 2 may be parallel or perpendicular to each other, and can be designed adaptively based on the actual light-output path of the light source device 100. The light-output directions of the first laser light source group 1 and the second laser light source group 2 may also be designed for the purpose of simplifying the structure of the light source device 100.

Figure 16:
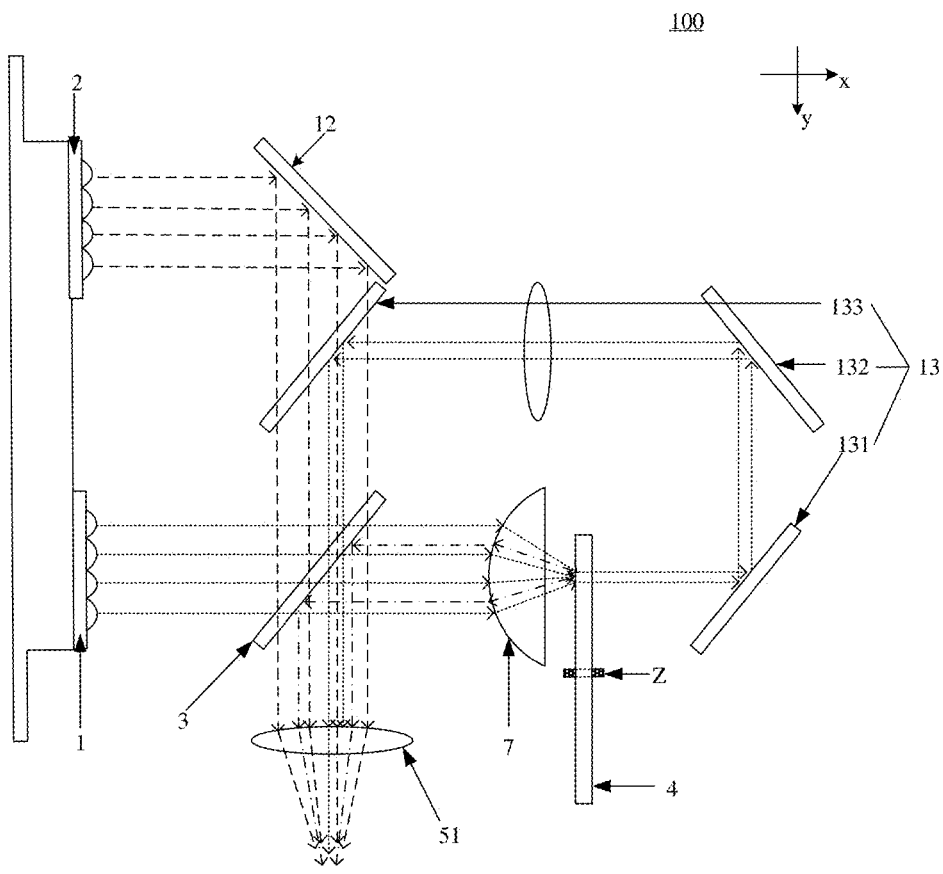
FIG. 16 is a schematic structural diagram of an eighth exemplary light source device according to some embodiments of the present disclosure.

In some examples, as shown in FIG. 16 or FIG. 17, the light source device 100 further includes at least one of the first reflector 11 or the second reflector 12. The first reflector 11 is configured to change the direction of the light path of the laser light emitted from the first laser light source group 1, and the second reflector 12 is configured to change the direction of the light path of the laser light emitted from the second laser light source group 2.

The reflector is configured to change the direction of the light path of the laser light emitted from the first laser light source group 1 and/or the second laser light source group 2. For example, the reflector can change the direction of the light path of the emergent light from the first direction to the second direction, so as to flexibly adjust the directions of the light paths of the blue laser light and the laser light of a plurality of colors.

For example, FIG. 1 shows that the first laser light source group 1 and the second laser light source group 2 are arranged independently of each other, one of the first laser light source group 1 and the second laser light source group 2 is arranged along a first direction and the other one is arranged along a second direction. The first direction is perpendicular to the second direction, that is, the light-output direction of the first laser light source group 1 and the light-output direction of the second laser light source group 2 are perpendicular to each other.

FIG. 16 shows that the first laser light source group 1 and the second laser light source group 2 are arranged independently of each other, the light-output direction of the first laser light source group 1 and the light-output direction of the second laser light source group 2 are parallel to each other, and the second laser light source group 2 is provided with one second reflector 12 to change the direction of the light path of the laser light emitted by the second reflector.

Figure 10:
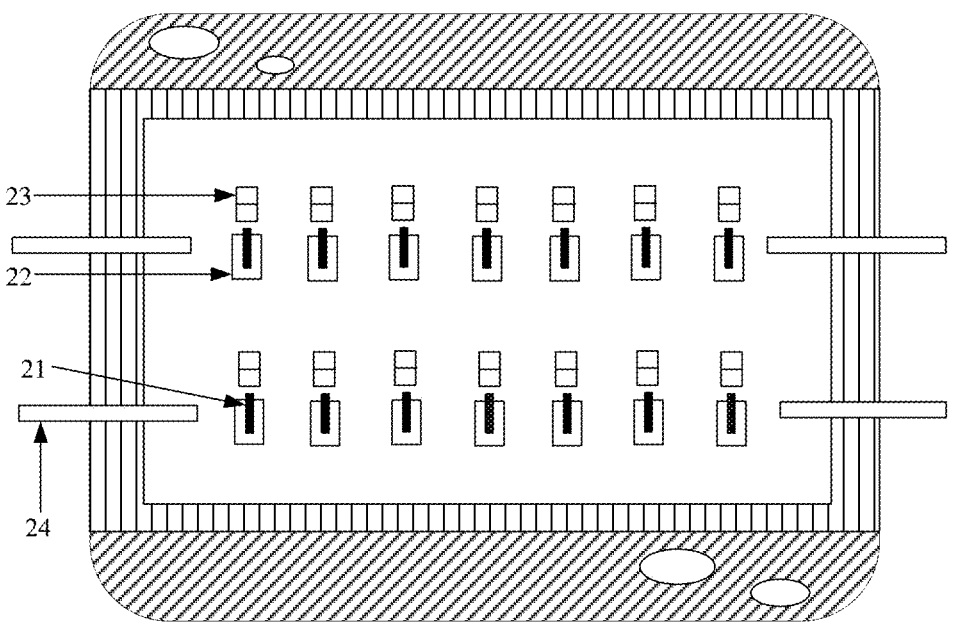
FIG. 10 is a schematic structural diagram of an exemplary second laser light source group according to some embodiments of the present disclosure.
Figure 11:
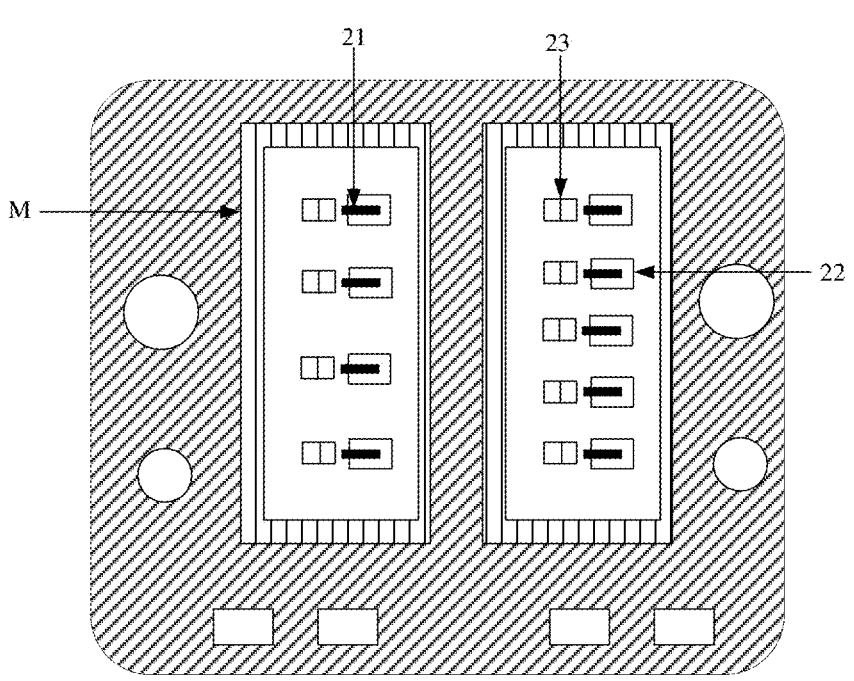
FIG. 11 is a schematic structural diagram of another exemplary second laser light source group according to some embodiments of the present disclosure.

For the structure of the second laser light source group 2 which is arranged independently, reference may be made to FIG. 10 or FIG. 11. FIG. 10 is a schematic structural diagram of a second laser light source group 2 according to some embodiments of the present disclosure. As shown in FIG. 10, the second laser light source group 2 includes two rows of light-emitting chips 21 arranged on a base plate (not shown in the figure). One row of light-emitting chips are red light-emitting chips for emitting red laser light, and the other row of light-emitting chips are green light-emitting chips for emitting green laser light. The second laser light source group 2 further includes four conductive pins 24, which include two positive pins and two negative pins. Each row of light-emitting chips are connected in series and are connected at two ends to a positive pin and a negative pin respectively to receive current transmitted from an external power supply through the positive pin and the negative pin, thereby emitting laser light under the action of the current. The laser shown in FIG. 10 is referred to as a multi-chip laser diode (MCL) type laser.

Exemplarily, the second laser light source group 2 further includes a plurality of heat sinks 22 and a plurality of reflecting prisms 23. Each light-emitting chip 21 in the second laser light source group 2 corresponds to one heat sink 22 and one reflecting prism 23. The heat sink 22 is fixed on the base plate, the light-emitting chip 21 is fixed on the heat sink 22 to be fixed on the base plate, and the reflecting prism 23 is disposed on the light-output side of the corresponding light-emitting chip 21. The light-emitting chip 21 emits laser light to the corresponding reflecting prism 23, and the reflecting prism 23 emits the incident laser light in the direction away from the base plate. In this way, the second laser light source group 2 achieves light emission.

Figure 12:
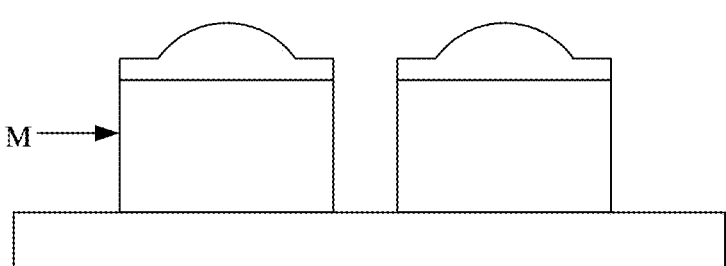
FIG. 12 is a schematic structural diagram of another exemplary second laser light source group according to some embodiments of the present disclosure.

FIG. 11 is a schematic structural diagram of another second laser light source group 2 according to some embodiments of the present disclosure, and FIG. 12 is a schematic structural diagram of another second laser light source group 2 according to some embodiments of the present disclosure. FIG. 11 is a top view of the laser shown in FIG. 12. As shown in FIG. 11 and FIG. 12, the second laser light source group 2 includes two light-emitting modules M arranged on the base plate (not shown in the figures), and each light-emitting module M is provided with one type of light-emitting chips 21, that is, the light-emitting module M on the left is provided with a row of red light-emitting chips 21, and the light-emitting module M on the right is provided with a row of green light-emitting chips 21. The lasers shown in FIG. 11 and FIG. 12 are referred to as Qualas-packaged lasers.

It should be noted that the embodiments of the present disclosure are merely illustrated by way of an example in which the second laser light source group 2 includes a row of red light-emitting chips and a row of green light-emitting chips. Exemplarily, the second laser light source group 2 may also be provided with light-emitting chips for emitting laser light of other colors, e.g., a row of blue light-emitting chips. Alternatively, the blue light-emitting chips and the green light-emitting chips are arranged in one row. In practice, the number, the number of rows, and the arrangement of the light-emitting chips to be provided are determined based on the brightness requirement or other requirements.

In some other implantations, referring to FIG. 17, the first laser light source group 1 and the second laser light source group 2 are integrally arranged and cooperate to form a laser light source array, and only one set of light paths is required in this case, which helps simplify the light path, simplify the structural arrangement of the light source device 100, and reduce energy consumption.

In the case that the first laser light source group 1 and the second laser light source group 2 are integrally arranged and cooperate to form the laser light source array, the laser light source array adopts may a laser array or a laser including a plurality of laser light sources, such as an MCL laser, which is not limited herein.

In some examples, as shown in FIG. 17, the light source device 100 further includes at least one of a first reflector 11 or a second reflector 12. The first reflector 11 is configured to change the direction of the light path of the laser light emitted from the first laser light source group 1, and the second reflector 12 is configured to change the direction of the light path of the laser light emitted from the second laser light source group 2.

For example, FIG. 17 shows that the first laser light source group 1 and the second laser light source group 2 are integrally arranged. The light-output directions of the first laser light source group 1 and the second laser light source group 2 are parallel, and the first laser light source group 1 and the second laser light source group 2 are configured with a first reflector 11 and a second reflector 12, respectively. The first reflector 11 is disposed on the light-output side of the first laser light source group 1, and the first reflector 11 is configured to reflect the light emitted from the first laser light source group 1, for example, reflect the light to the second portion 322 of the dichroic mirror. The second reflector 12 is disposed on the light-output side of the second laser light source group 2, and the second reflector 12 is configured to reflect the light emitted from the second laser light source group 2, for example, reflect the light to the fourth portion 324 of the dichroic mirror.

The laser beams emitted from the first laser light source group 1 and the second laser light source group 2 may be regarded as a laser spot when incident on the corresponding reflector. Therefore, the size of the first reflector 11 and the size of the second reflector 12 need to be greater than the size of the incident laser spot. By setting the first reflector 11 and the second reflector 12 at suitable angles, the laser light emitted from the first laser light source group 1 can be incident to the second portion 322 after being reflected by the first reflector 11, and the laser light emitted from the second laser light source group 2 can be incident to the fourth portion 324 after being reflected by the second reflector 12.

The dichroic mirror 3 in the light source device 100 provided in the embodiments of the present disclosure is described below in combination with the accompanying drawings, and the dichroic mirror 3 is described by taking the dichroic mirror 3 in the light source device 100 shown in FIG. 1 or FIG. 3 as an example. For the characteristics of the first region 311 of the dichroic mirror 3 in the light source device 100 shown in FIG. 4, reference may be made to the following description of the dichroic mirror 3.

In the embodiments of the present disclosure, at least a partial region of the dichroic mirror 3 has a transmittance that is greater than a first probability threshold to light of a wavelength within a target wavelength range and has a transmittance that is less than a second probability threshold to light of a wavelength outside the target wavelength range. The first probability threshold is greater than the second probability threshold, the first probability threshold approximates 1, and the second probability threshold approximates 0. Exemplarily, the first probability threshold is 90%, 93%, 94%, or even 96%, and the second probability threshold is 10%, 8%, 5%, or even less, which is not limited in the embodiments of the present disclosure. For example, the dichroic mirror 3 can reflect light of a wavelength outside the target wavelength range, and the reflectivity of the light of the wavelength outside the target wavelength range is greater than the first probability threshold. For the dichroic mirrors 3 shown in FIG. 1 and FIG. 3, the at least partial region is the entire region of the dichroic mirror 3, and for the dichroic mirror 3 shown in FIG. 4, the at least partial region is the first region 311 of the dichroic mirror 3.

A wavelength within the target wavelength range meets the condition that the absolute value of the wavelength difference between the wavelength and the central wavelength of the laser light of the first waveband emitted from the first laser light source group 1 is less than a wavelength difference threshold, or the absolute value of the wavelength difference between the wavelength and the central wavelength of either of the laser light of the second waveband and the laser light of the third waveband emitted from the second laser light source group 2 is less than the wavelength difference threshold. In the case that a is used for representing the central wavelength of the laser light and b is used for representing the wavelength difference threshold, the wavelength having an absolute value of wavelength difference from the central wavelength that is less than the wavelength difference threshold is a wavelength within the range of a±b.

Exemplarily, the wavelength difference threshold ranges from 3 nm to 10 nm, and further ranges from 3 nm to 6 nm. The target wavelength range includes the wavelength of the laser light of the first waveband emitted from the first laser light source group 1 and the wavelengths of all laser light emitted from the second laser light source group 2. In this way, it is ensured that the dichroic mirror 3 can transmit the laser light of the second waveband or the third waveband emitted from the first laser light source group 1 and the laser light emitted from the second laser light source group 2.

Figure 5:
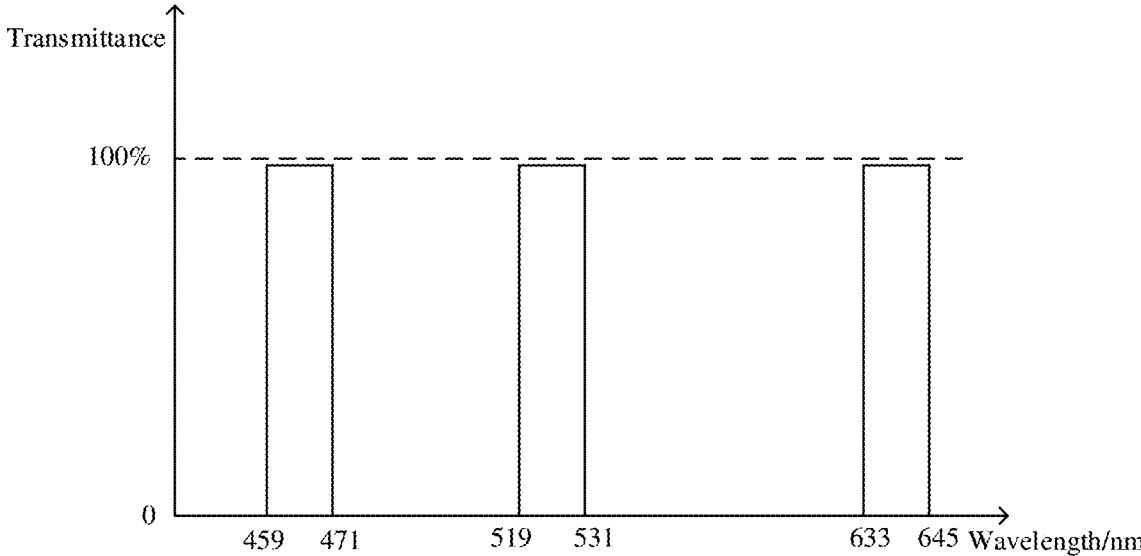
FIG. 5 is a diagram showing a relationship between transmittance of a dichroic mirror to light and a wavelength of light according to some embodiments of the present disclosure.

Assuming that the first laser light source group 1 emits blue laser light with a central wavelength of 465 nm, the second laser light source group 2 emits red laser light with a central wavelength of 639 nm and green laser light with a central wavelength of 525 nm, and the wavelength difference threshold is 6 nm, then the target wavelength range of the laser light to which the transmittance of the dichroic mirror 3 is greater than the first probability threshold includes 459 nm~471 nm, 519 nm~531 nm, and 633 nm~645 nm. FIG. 5 is a diagram showing a relationship between the transmittance of a dichroic mirror to light and a wavelength of light according to some embodiments of the present disclosure. In the coordinate system shown in FIG. 5, the horizontal coordinate represents the wavelength of light, and the vertical coordinate represents the transmittance of the dichroic mirror 3 to the light of each wavelength. As shown in FIG. 5, under the above assumption, the transmittance of the dichroic mirror 3 to laser light of wavelengths within the target wavelength range (i.e., 459 nm~471 nm, 519 nm~531 nm, and 633 nm~645 nm) approximates 100%, and the transmittance to laser light of other wavelengths approximates 0 (FIG. 5 takes the transmittance being 0 as an example).

As can be seen from FIG. 5, the curve of the transmittance of the dichroic mirror 3 in the embodiments of the present disclosure is in a square wave shape, with a steeper slope at the edge, and the transmittance varies greatly in a very short wavelength range. For example, the transmittance of the dichroic mirror 3 to laser light of a wavelength of 471 nm approximates 100%, while the transmittance to laser light of a wavelength of 473 nm approximates 0. Therefore, laser light of wavelengths outside the target wavelength range is substantially not transmitted through the dichroic mirror 3.

In the embodiments of the present disclosure, the dichroic mirror 3 may only have a high transmittance to the light of a wavelength within the target wavelength range, while having a high reflectivity to all of the light of wavelengths outside the target wavelength range. In this way, it can be ensured that the dichroic mirror 3 transmits light of wavelengths that are outside the target wavelength range and close to the target wavelength range as little as possible under the premise that the dichroic mirror 3 transmits light of wavelengths whim the target wavelength range, thereby avoiding the mixing of different colors of light. In the embodiments of the present disclosure, as the fluorescence emitted from the fluorescence converter 4 needs to be reflected on the dichroic mirror 3, and the fluorescence has a wide wavelength range, the wavelength range of the fluorescence may overlap the target wavelength range. In the embodiments of the present disclosure, the dichroic mirror 3 also has a high reflectivity to light of wavelengths outside the target wavelength range and close to the target wavelength range, which can ensure that the fluorescence is reflected on the dichroic mirror 3 as much as possible, and ensure that there is less lost fluorescence that is transmitted through the dichroic mirror 3. Additionally, in the embodiments of the present disclosure, the wavelength difference threshold is small. Therefore, even if there is a loss of fluorescence that is transmitted through the dichroic mirror 3, the amount of transmitted fluorescence is small, the loss of fluorescence is small, and the high output efficiency of the fluorescence can still be ensured.

In one implementation, referring to FIG. 1 or FIG. 17, the emission component 5 in the light source device 100 provided in the embodiments of the present disclosure is an exit lens 51. The fluorescence of the second waveband and the laser light of the second waveband are combined at the exit lens 51 and emitted from the exit lens 51, and the fluorescence of the third waveband and the laser light of the third waveband are combined at the exit lens 51 and emitted from the exit lens 51.

Figure 8:
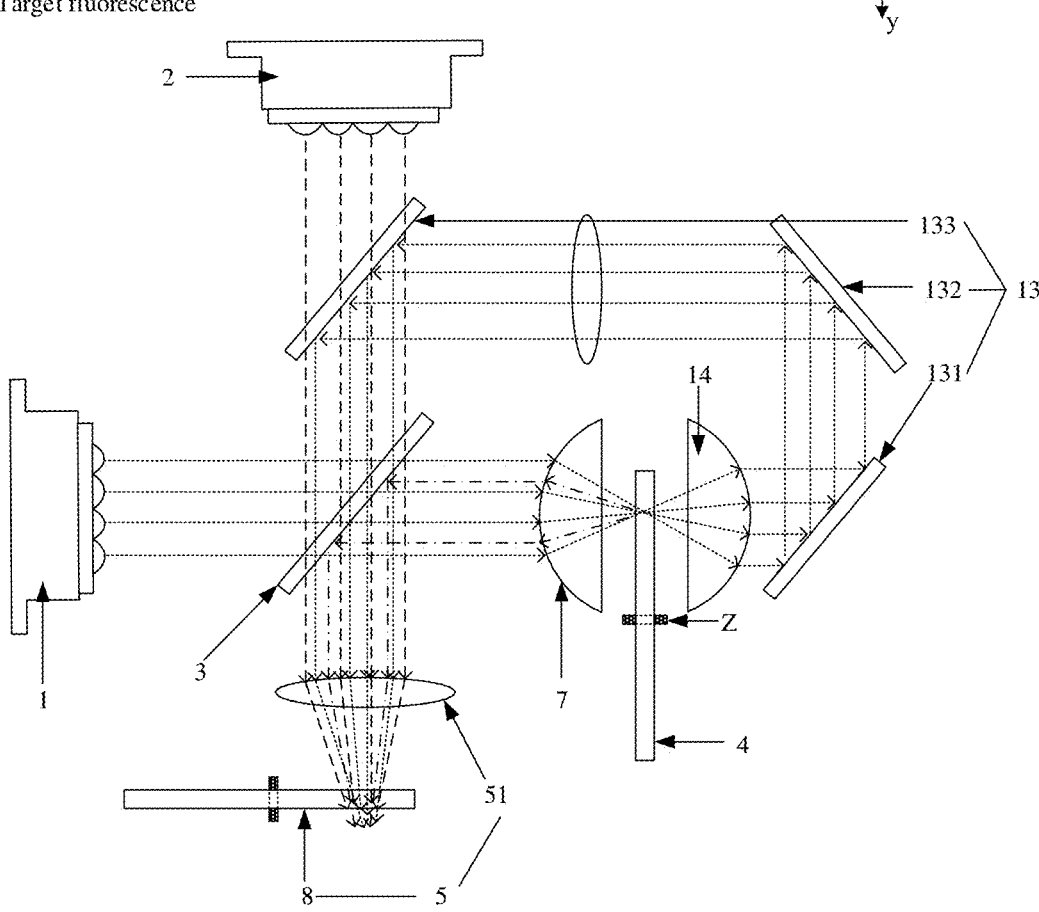
FIG. 8 is a schematic structural diagram of a fourth exemplary light source device according to some embodiments of the present disclosure.
Figure 13:
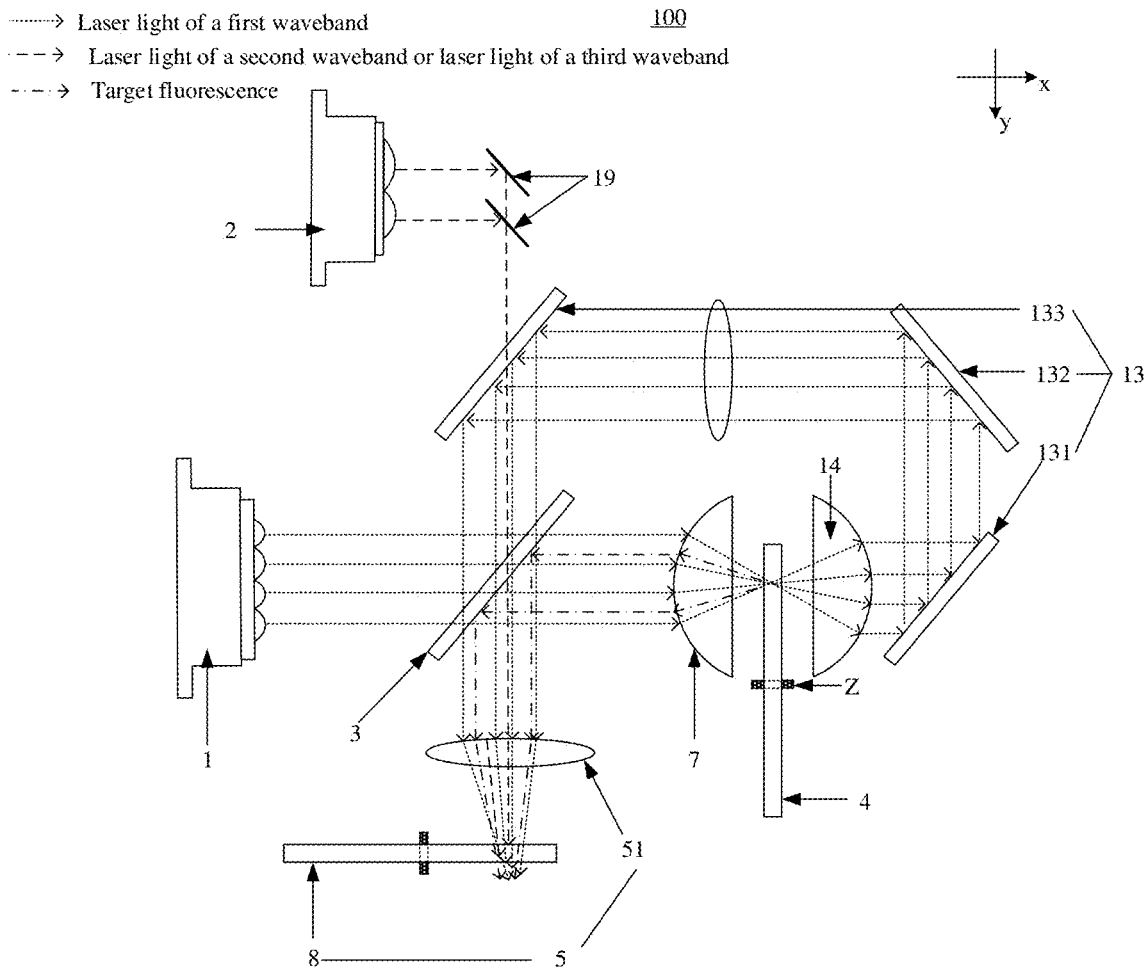
FIG. 13 is a schematic structural diagram of a fifth exemplary light source device according to some embodiments of the present disclosure.
Figures 14, 15:
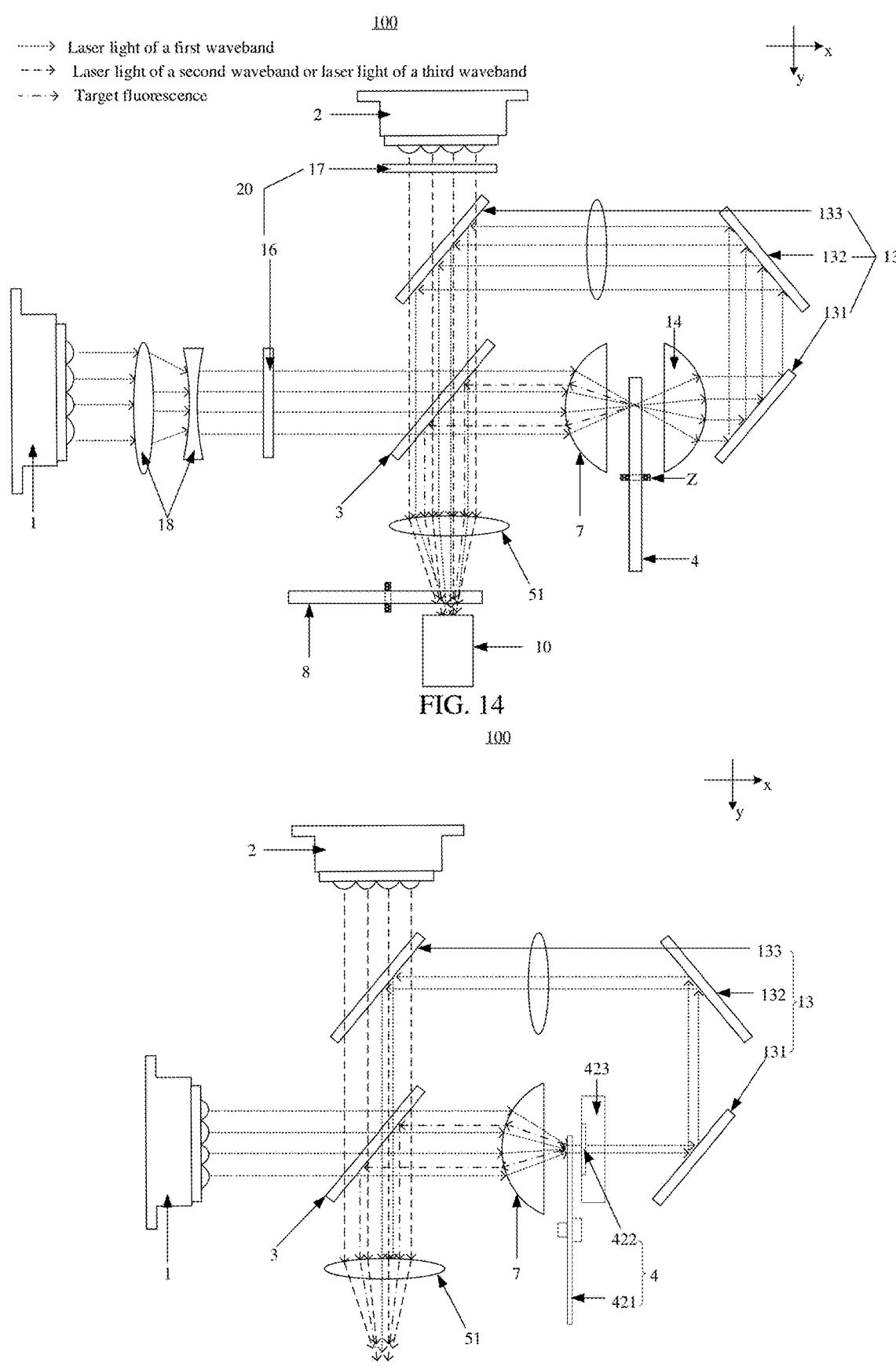
FIG. 14 is a schematic structural diagram of a sixth exemplary light source device according to some embodiments of the present disclosure.
FIG. 15 is a schematic structural diagram of a seventh exemplary light source device according to some embodiments of the present disclosure.

In another implementation, referring to FIG. 8, FIG. 13, or FIG. 14, the emission component 5 includes an exit lens 51 and a color filter wheel 8. The color filter wheel 8 includes a first light filter region 81, a second light filter region 82, and a transmission region 83, and the color filter wheel 8 is configured to rotate such that different regions receive the light from the exit lens 51. The first light filter region 81 is configured to receive the target fluorescence and the laser light of the second waveband emitted from the exit lens 51, and configured to filter color for the target fluorescence to obtain fluorescence of the second waveband, the fluorescence of the second waveband and the laser light of the second waveband are combined and emitted from the first light filter region 81. The second light filter region 82 is configured to receive the target fluorescence and the laser light of the third waveband from the exit lens 51, and configured to filter color for the target fluorescence to obtain fluorescence of the third waveband, and the fluorescence of the third waveband and the laser light of the third waveband are combined and emitted from the second light filter region. The transmission region 83 is configured to receive the laser light of the first waveband from the exit lens 51.

In some implementations, any one of the light source devices involved in the embodiments of the present disclosure further includes at least one of a first collimating lens 6, a focusing lens 7, a first beam homogenizer 9, or a second beam homogenizer 10.

The first collimating lens 6 is disposed between at least one of the first laser light source group 1 or the second laser light source group 2 and the dichroic mirror 3. For example, one first collimating lens 6 is arranged between the first laser light source group 1 and the dichroic mirror 3, and one first collimating lens 6 is arranged between the second laser light source group and the dichroic mirror 3, and this is applicable to the situation that the first laser light source group 1 and the dichroic mirror 3 have different light-output directions. Alternatively, for example, the first collimating lens 6 is disposed between both of the first laser light source group 1 and the second laser light source group 2 and the dichroic mirror 3, and this is applicable to the situation that the light-output directions of the first laser light source group 1 and the dichroic mirror 3 are parallel to each other.

Figure 24:
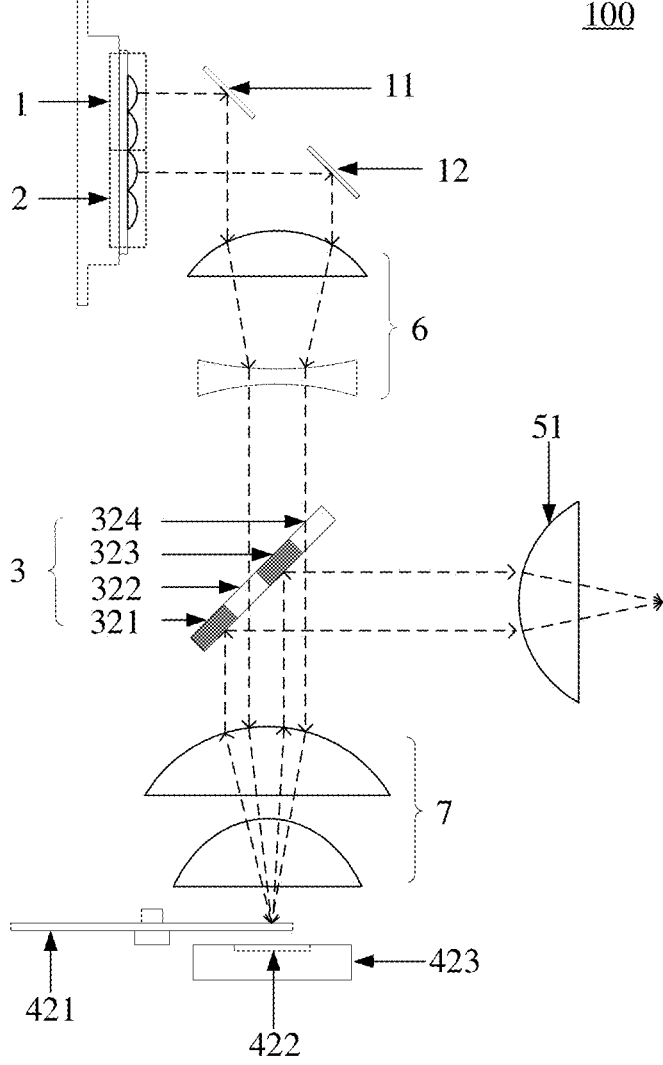
FIG. 24 shows a schematic structural diagram of a tenth exemplary light source device according to some embodiments of the present disclosure.

The first collimating lens 6 includes at least one lens. For example, FIG. 24 shows that the first collimating lens 6 includes two lenses disposed sequentially along the light-output direction.

By providing the first collimating lens 6, the blue laser light emitted from the first laser light source group 1 and the laser light of a plurality of colors emitted from the second laser light source group 2 can be collimated and shaped to reduce the size of the laser spot.

The focusing lens 7 is disposed between the dichroic mirror 3 and the fluorescence converter 4, and the focusing lens 7 is capable of focusing the laser light emitted from the dichroic mirror 3 and emitting the laser light emitted from the dichroic mirror 3 to the fluorescence converter to avoid laser light loss.

The first beam homogenizer 9 is disposed between at least one of the first laser light source group 1 or the second laser light source group 2 and the dichroic mirror 3, or disposed between the first collimating lens 6 and the dichroic mirror 3. The first beam homogenizer 9 may be in the form of a light homogenization layer, and a diffusion sheet may be used to form the first beam homogenizer 9.

The laser light emitted from the first laser light source group 1 and the second laser light source group 2 has high energy. In order to avoid laser light specking and avoid the fluorescence light conversion efficiency from being reduced due to the too high energy of the laser light incident to the fluorescence converter 4, the first beam homogenizer 9 is provided in the light path to homogenize the laser light.

The second beam homogenizer 10 is disposed on the light-output side of the emission component 5, including the light-output side of the exit lens 51 or the light-output side of the color filter wheel 8. For example, FIG. 14 shows that the second beam homogenizer 10 is disposed on the light-output side of the color filter wheel 8, and FIG. 27 shows that the second beam homogenizer 10 is disposed on the light-output side of the exit lens 51. Exemplarily, the second beam homogenizer 10 is a light stick, a light pipe, or the like.

The second beam homogenizer 10 is configured to further homogenize the three basic colors of light that are ultimately emitted from the light source device 100 and then the three basic colors of light are incident to a display component. Therefore, the second beam homogenizer 10 is provided at the light exit port of the light source device 100, and the exit lens 51 is provided in front of the second beam homogenizer 10 to converge light, such that as much light as possible is incident to the second beam homogenizer 10 for usage.

The light source device 100 involved in the embodiments of the present disclosure may be implemented in a combination of the above-described multiple implementations, and therefore there are multiple implementations for the light source device 100 involved in the embodiments of the present disclosure. Some typical light source devices 100 are respectively described below exemplarily with reference to the accompanying drawings of the present disclosure.

In implementation (1), referring to FIG. 1, FIG. 3, FIG. 4, FIG. 8, FIG. 13, and FIG. 14, the light-output path of the light source device 100 is the first light-output path, and the first light-output path includes: a path of a light beam of the laser light of the first waveband that is separately along which the laser light of the first waveband is emitted via the dichroic mirror 3, the fluorescence converter 4, the dichroic mirror 3, and the emission component 5; a path of a light beam of the laser light of the second waveband and the fluorescence of the second waveband that are combined and emitted along which the laser light of the second waveband passes through the dichroic mirror 3 and the emission component 5, and is combined with the fluorescence of the second waveband at the emission component 5 and emitted from the emission component 5; and a path of a light beam of the laser light of the third waveband and the fluorescence of the third waveband that are combined and emitted along which the laser light of the third waveband passes through the dichroic mirror 3 and the emission component 5, and is combined with the fluorescence of the third waveband at the emission component 5 and emitted from the emission component 5.

Based on the above first light-output path, as shown in FIG. 1, the first laser light source group 1, the dichroic mirror 3, the focusing lens 7, and the fluorescence converter 4 are arranged sequentially along the first direction (e.g., the x direction)., and the second laser light source group 2, the dichroic mirror 3, the focusing lens 7 and the emission component 5 are arranged sequentially along the second direction (e.g., the y direction). The first direction intersects the second direction, and the embodiments of the present disclosure are described by way of an example in which the first direction is perpendicular to the second direction.

The working principle of the light source device 100 involved in implementation (1) is illustrated exemplarily with reference to FIG. 1. In FIG. 1, the focusing lens 7 is provided, and thus the focusing lens 7 will be involved in the following description, which does not exclude the technical solution without the focusing lens 7.

In FIG. 1, the dotted line with an arrow is used for schematically representing the light, and the dotted line is only used to illustrate a transmission path of the light, and the difference in the number of the dotted lines at various positions does not represent the difference in the actual amount of light at the various positions. In FIG. 1, the target laser light represents the laser light emitted from the second laser light source group 2.

As shown in FIG. 1, the dichroic mirror 3 is configured to transmit the laser light of a plurality of colors and the blue laser light. Therefore, the laser light of the plurality of colors passes through the dichroic mirror 3 and is incident to emission component 5, and then the laser light of the plurality of colors is converged by the emission component 5 and emitted from the emission component 5. The blue laser light passes through the dichroic mirror 3 and is incident to the focusing lens 7, and the focusing lens 7 is configured to converge the blue laser light received from the dichroic mirror 3 to the fluorescence converter 4.

Hereinafter, by taking the fluorescence converter 4 in the form of a fluorescent wheel as an example, the fluorescence conversion region 411 of the fluorescence converter 4 is configured to emit fluorescence under the excitation of the received blue laser light, and the fluorescence is incident to the focusing lens 7. The focusing lens 7 is configured to emit the received fluorescence to the dichroic mirror 3 along an opposite direction of the first direction. The laser emission region 412 of the fluorescence converter 4 is configured to transmit or reflect the received blue laser light, and the blue laser light passing through the laser emission region is subsequently incident to the dichroic mirror 3. FIG. 1 is shown by way of an example where the laser emission region 412 is a transmission region for transmitting the received blue laser light, and the blue laser light transmitted through the laser emission region is transmitted again to the dichroic mirror 3 via other optical components.

The dichroic mirror 3 is configured to reflect the received fluorescence to the emission component 5, and then the fluorescence is converged by the exit lens 51 of the emission component 5 and emitted for subsequent usage. The dichroic mirror 3 is further configured to emit the received blue laser light passing through the laser emission region 412 to the emission component 5, and then the blue laser light is converged by the exit lens 51 of the emission component 5 and emitted from the exit lens 51.

The exit lens 51 converges and emits the incident light, and the light emitted from the exit lens 51 is used for forming projection images. Therefore, the light emitted from the exit lens 51 includes the blue laser light emitted from the first laser light source group 1 and passing through the laser emission region 412 of the fluorescence converter 4, the fluorescence emitted from the fluorescence conversion region 411 of the fluorescence converter 4, and the laser light of a plurality of other colors emitted from the second laser light source group 2.

The fluorescence emitted from the fluorescence conversion region 411 of the fluorescence converter 4 may be incident at a wide light-output angle range to the focusing lens 7. Exemplarily, the fluorescence may be parallel light after passing through the focusing lens 7. As the fluorescence region in the fluorescent wheel is like a Lambertian body when emitting light and emits light to the entire surface of the focusing lens 7, the focusing lens 7 can collimate the incident light and thus the light is emitted in a whole beam similar to parallel light. The embodiments of the present disclosure are described by way of example where the focusing lens 7 is only a convex lens. Exemplarily, the focusing lens 7 may also include a plurality of lenses to improve the light convergence effect of the focusing lens 7.

Based on implementation (1), one way of arranging the fluorescence converter 4 is to adopt the fluorescence converter 4 in the form of a fluorescent wheel as described above (see FIG. 1), and another way is to adopt the fluorescence converter 4 including the dynamic optical component 421, the fluorescence conversion component 422, and the heat dissipation component 423 (see FIG. 15).

The fluorescence converter 4 in the form of the fluorescent wheel is taken as an example for illustration below. The time sequence of light emission of the second laser light source group 2 matches the rotation of the fluorescence converter 4 in the form of the fluorescent wheel. Exemplarily, the second laser light source group 2 is configured to emit laser light of a first color and laser light of a second color. The fluorescence conversion region 411 of the fluorescence converter 4 includes a sub-region for emitting fluorescence of the first color and a sub-region for emitting fluorescence of the second color.

For example, the first color is red and the second color is green. For the convenience of description, the sub-region for emitting fluorescence of a certain color in the fluorescence conversion region 411 of the fluorescence converter 4 is hereinafter referred to as a fluorescence region of that color, for example, a sub-region for emitting red fluorescence is referred to as a red fluorescence region. When the fluorescence converter 4 rotates such that the red fluorescence region therein receives blue laser light, the second laser light source group 2 emits red laser light. When the green fluorescence region of the fluorescence converter 4 receives the blue laser light, the second laser light source group 2 emits green laser light. When the laser emission region 412 of the fluorescence converter 4 receives the blue laser light, the second laser light source group 2 may not emit laser light. Exemplarily, the second laser light source group 2 may also be configured to emit the blue laser light. When the laser emission region 412 of the fluorescence converter 4 receives the blue laser light, the second laser light source group 2 may emit the blue laser light. In this way, it can be ensured that the laser light of each color emitted from the second laser light source group 2 is combined with the fluorescence of that color and then is emitted out, which facilitates the subsequent time-division modulation of different colors of light emitted from the light source device 100.

Exemplarily, the fluorescence conversion region 411 of the fluorescence converter 4 may be configured to be excited to emit fluorescence of only one color, and other processing may be performed on the fluorescence of the one color subsequently to obtain fluorescence of a plurality of colors. The fluorescence of the plurality of colors may be of the same color as the laser light of colors other than blue emitted from the second laser light source group 2. For example, the second laser light source group 2 emits laser light of a first color and laser light of a second color, and the fluorescence conversion region 411 may be configured to be excited to emit yellow fluorescence only, and other processing (e.g., light filtering) may be performed on the yellow fluorescence to obtain fluorescence of the first color and fluorescence of the second color. The first color is red, and the second color is green.

In implementation (1), the laser light of the first waveband from the fluorescence converter 4 is transmitted by the dichroic mirror 3 to the emission component 5, that is, the laser emission region 412 is a transmission region, the blue laser light emitted from the first laser light source group 1 is transmitted by the dichroic mirror 3 and then is transmitted by the laser emission region 412 of the fluorescence converter 4 to the dichroic mirror 3. In this case, as shown in FIG. 1, the light source device 100 further includes a light path adjusting lens group 13 and a second collimating lens 14. The second collimating lens 14 is configured to collimate the laser light of the first waveband from the fluorescence converter 4 and emit the laser light of the first waveband to the light path adjusting lens group 13. The light path adjusting lens group 13 is configured to emit the received laser light of the first waveband to the dichroic mirror 3, and the dichroic mirror 3 is configured to transmit the received laser light of the first waveband from the light path adjusting lens group 13 to the emission component 5.

By taking an example in which the laser light of the first waveband is the blue laser light, the laser light of the second waveband is red laser light, and the laser light of the third waveband is green laser light, as shown in FIG. 1, the blue laser light emitted from the focusing lens 7 is transmitted through the laser emission region 412. The light source device 100 further includes a light path adjusting lens group 13. The blue laser light transmitted through the laser emission region 412 is incident to the light path adjusting lens group 13, and then is transmitted by the light path adjusting lens group 13 back to the dichroic mirror 3, and the blue laser light passes through the dichroic mirror 3 and is incident to the emission component 5 (specifically, the exit lens 51). In this implementation, the dichroic mirror 3 has the same trans-reflection properties at various positions.

Exemplarily, as shown in FIG. 1, the light path adjusting lens group 13 includes a first mirror 131, a second mirror 132, and a third mirror 133. The third mirror 133 is disposed between the second laser light source group 2 and the dichroic mirror 3. The first mirror 131 and the second mirror 132 are reflective mirrors. The third mirror 133 is dichroic and is configured to reflect the blue laser light emitted from the first laser light source group 1 and transmit the laser light of a plurality of other colors emitted from the second laser light source group 2. The laser emission region 412 of the fluorescence converter 4 transmits the received blue laser light to the first mirror 131.

The first mirror 131 reflects the blue laser light to the second mirror 132, the second mirror 132 reflects the blue laser light to the third mirror 133, and the third mirror 133 reflects the blue laser light to the dichroic mirror 3. The laser light of the plurality of colors emitted from the second laser light source group 2 is also first incident to the third mirror 133, the third mirror 133 transmits the laser light emitted from the second laser light source group 2 to the dichroic mirror 3, and then the laser light is transmitted by the dichroic mirror 3 to the exit lens 51. The light path adjusting lens group 13 further includes a convex lens (not shown in the figures) disposed between the second mirror 132 and the third mirror 133, and the convex lens is configured to shape the laser light emitted from the second mirror 132 and then emit the shaped laser light to the third mirror 133.

Figure 3:
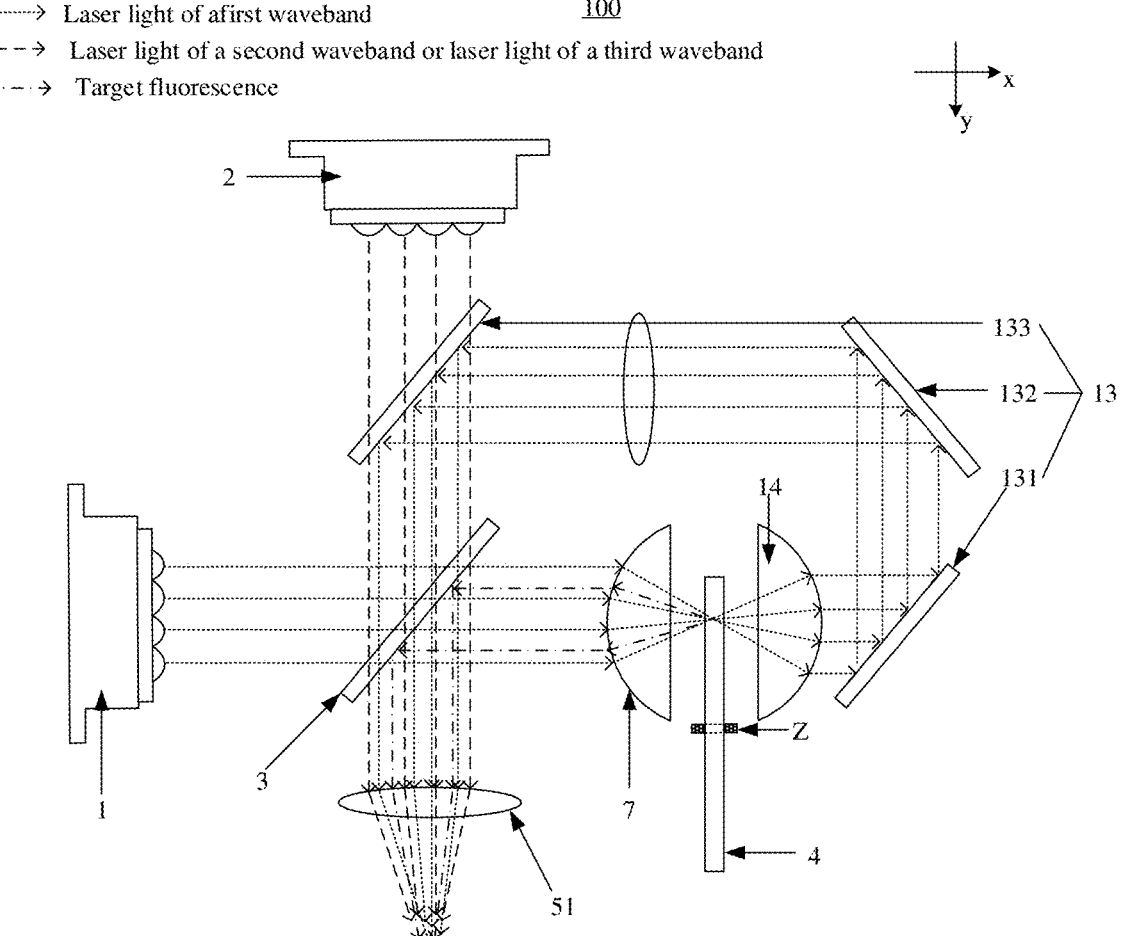
FIG. 3 is a schematic structural diagram of a second exemplary light source device according to some embodiments of the present disclosure.

Exemplarily, FIG. 3 shows a schematic structural diagram of another light source device according to some embodiments of the present disclosure. As shown in FIG. 3, on the basis of FIG. 1, the light source device 100 further includes a second collimating lens 14. The second collimating lens 14 is disposed between the fluorescence converter 4 and the light path adjusting lens group 13, for example, between the fluorescence converter 4 and the first mirror 131. The laser emission region 412 of the fluorescence converter 4 transmits the received blue laser light to the second collimating lens 14, the blue laser light is collimated by the second collimating lens 14 nearly into parallel light and is incident to the first mirror 131, and then the blue laser light passes through the light path adjusting lens group 13 and is incident to the dichroic mirror 3. The second collimating lens 14 is a lens same as the focusing lens 7. The second collimating lens 14 may be symmetrical to the focusing lens 7 with respect to the fluorescence converter 4.

After the blue laser light emitted from the first laser light source group 1 is converged by the focusing lens 7 to the fluorescence converter 4 and then emitted out, the light-output angle of the blue laser light becomes more diverged. In the embodiments of the present disclosure, the blue laser is collimated by the second collimating lens 14 before transmission, which can ensure that the energy of the blue laser in the transmission process is more concentrated and ensures a higher transmission efficiency of the blue laser. In addition, the light spot formed by the blue laser in the transmission process is smaller, and the light path adjusting lens group 13 with mirrors of a small size can reflect the blue laser, which facilitates the miniaturization of the light source device 100.

In the light source devices 100 shown in FIG. 1 and FIG. 3 in the embodiments of the present disclosure, the third mirror 133 in the light path adjusting lens group 13 is dichroic, and the properties of the third mirror 133 are similar to the properties of the dichroic mirror 3. Exemplarily, the third mirror 133 has a transmittance that is greater than a first probability threshold to the light of a wavelength within an auxiliary wavelength range and a transmittance that is less than a second probability threshold to light with a wavelength outside the target wavelength range. A wavelength in the auxiliary wavelength range meets the absolute value of the wavelength difference between the wavelength and the central wavelength of laser light of any color emitted from the second laser light source group 2 is less than a wavelength difference threshold. With regard to the first probability threshold, the second probability threshold, and the wavelength difference threshold, reference may be made to the relevant contents in the above description of the dichroic mirror 3, which are not repeated in the embodiments of the present disclosure.

Figure 6:
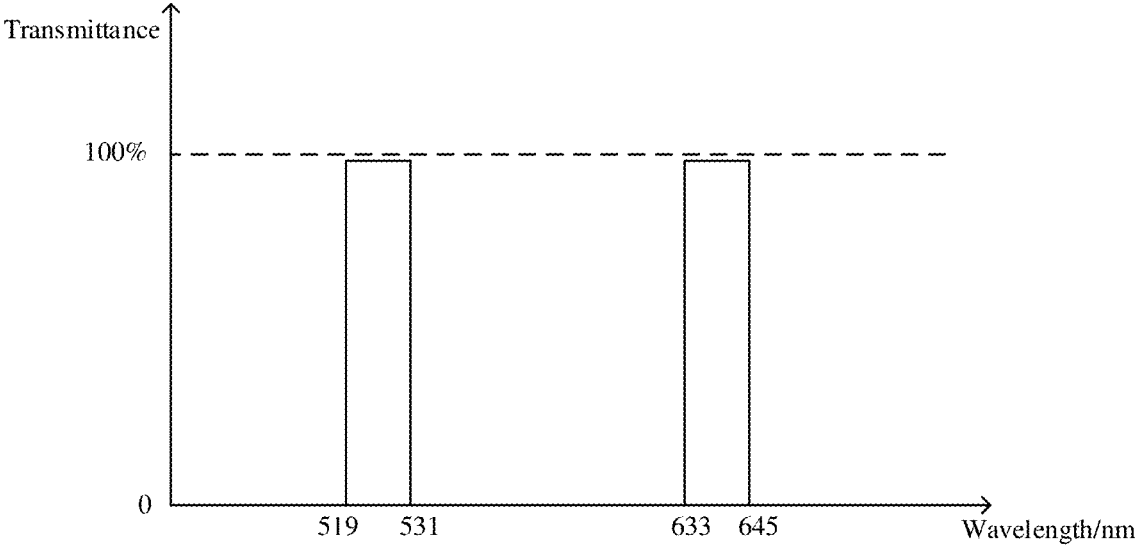
FIG. 6 is a diagram showing a relationship between transmittance of a third mirror to light and a wavelength of light according to some embodiments of the present disclosure.

Assuming that the second laser light source group 2 is configured to emit red laser light having a central wavelength of 639 nm and green laser light having a central wavelength of 525 nm and the wavelength difference threshold is 6 nm, then the auxiliary wavelength ranges of the laser light to which the transmittance of the third mirror 133 is greater than the first probability threshold include 519 nm to 531 nm and 633 nm to 645 nm. FIG. 6 is a diagram showing the relationship between the transmittance of the third mirror to light and the wavelength of light according to some embodiments of the present disclosure. In the coordinate system shown in FIG. 6, the horizontal coordinate represents the wavelength of light, and the vertical coordinate represents the transmittance of the third mirror 133 to light of each wavelength. As shown in FIG. 6, under the above assumption, the transmittance of the dichroic mirror 3 to laser light of wavelengths in the range of 519 nm to 531 nm and the range of 633 nm to 645 nm approximates 100%, and the transmittance to laser light of other wavelengths approximates 0 (FIG. 6 takes the transmittance being 0 as an example).

Figure 7:
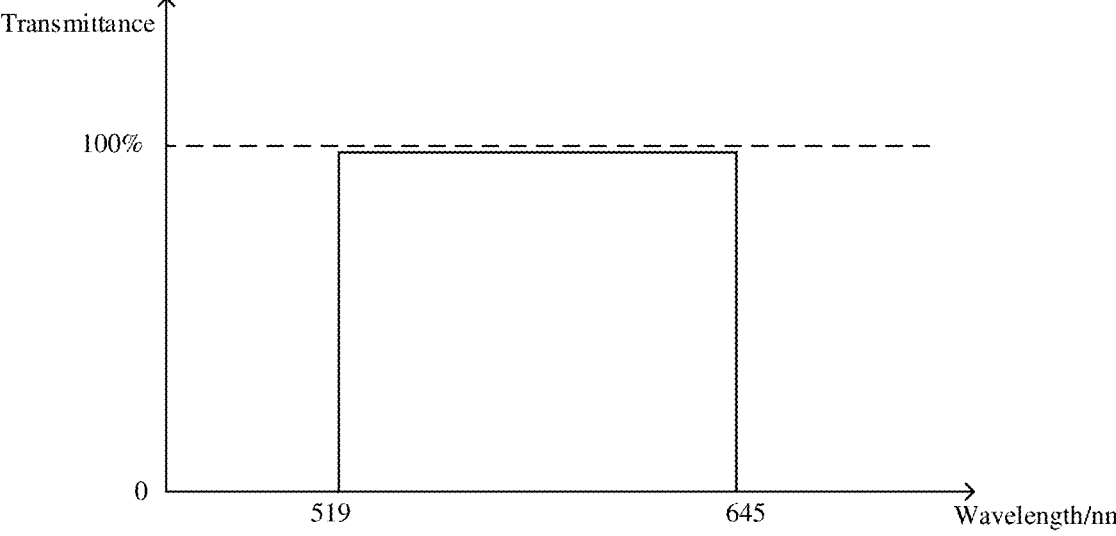
FIG. 7 is a diagram showing a relationship between transmittance of another third mirror to light and a wavelength of light according to some embodiments of the present disclosure.

Exemplarily, the auxiliary wavelength range of the laser light to which the transmittance of the third mirror 133 is greater than the first probability threshold also includes all wavelengths between the central wavelength of the red laser light and the central wavelength of the green laser light. FIG. 7 is a diagram showing the relationship between the transmittance of a third mirror to light and the wavelength of light according to some embodiments of the present disclosure. As shown in FIG. 7, the auxiliary wavelength range is 519 nm to 645 nm.

Figure 4:
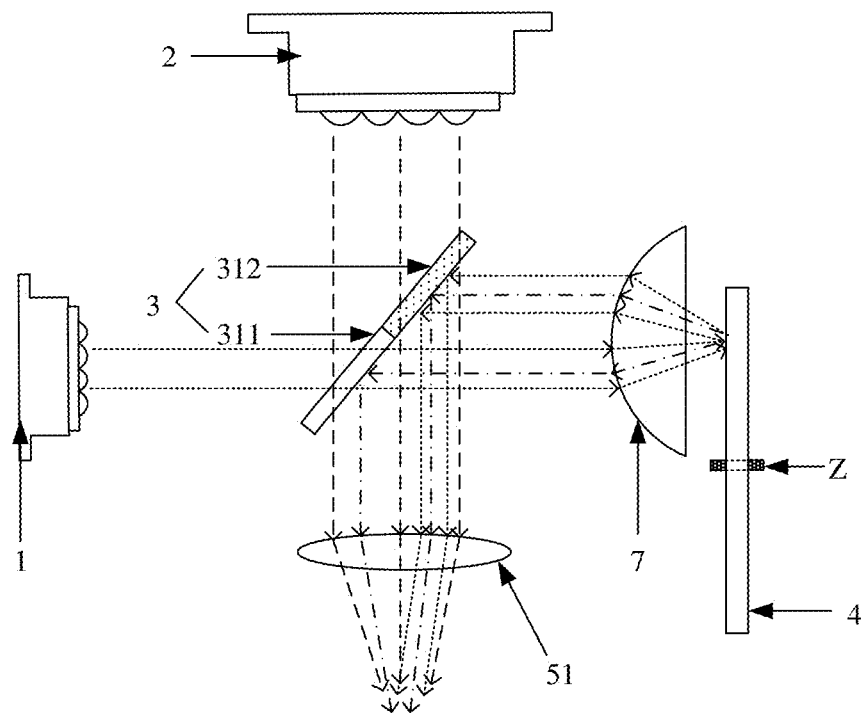
FIG. 4 is a schematic structural diagram of a third exemplary light source device according to some embodiments of the present disclosure.

In implementation (1), the laser light of the first waveband from the fluorescence converter 4 is reflected by the dichroic mirror 3 to the emission component 5, that is, the laser emission region 412 is a reflection region. In this case, as shown in FIG. 4, the dichroic mirror 3 includes a first region 311 and a second region 312. The first region 311 is configured to receive the laser light of the first waveband from the first laser light source group 1 and transmit the laser light of the first waveband to the fluorescence converter 4, and the second region 312 is configured to receive the laser light of the first waveband from the first region 311 and reflect the laser light of the first waveband to the emission component 5 (specifically, the exit lens 51). The first region 311 and the second region 312 are further configured to transmit the laser light of the second waveband or the laser light of the third waveband from the second laser light source group 2 to the emission component 5 (specifically, the exit lens 51).

By way of example where the laser light of the first waveband is blue laser light, the laser light of the second waveband is red laser light, and the laser light of the third waveband is green laser light, as shown in FIG. 4, the laser emission region 412 reflects the received blue laser light, and the reflected blue laser light passes through the focusing lens 7 and is incident to the dichroic mirror 3, and then is reflected by the dichroic mirror 3 to the exit lens 51.

The first region 311 and the second region 312 of the dichroic mirror 3 may have different trans-reflection properties. The first region 311 is configured to transmit the blue laser light emitted from the first laser light source group 1, the second region 312 is configured to reflect the blue laser light, and both the first region 311 and the second region 312 are configured to transmit the laser light emitted from the second laser light source group 2 and reflect the fluorescence emitted from the fluorescence conversion region 411 of the fluorescence converter 4.

Exemplarily, the blue laser light emitted from the first laser light source group 1 is incident to the first region 311 of the dichroic mirror 3, the blue laser light is transmitted by the first region 311 to the focusing lens 7, and then the blue laser light is converged by the focusing lens 7 to the fluorescence converter 4. The blue laser light may not pass through the optical axis of the focusing lens 7. When the laser emission region 412 of the fluorescence converter 4 receives the blue laser light, the blue laser light is reflected by the laser emission region 412 back to the focusing lens 7. Then the focusing lens 7 emits the blue laser light to the second region 312 of the dichroic mirror 3, and the second region 312 of the dichroic mirror 3 reflects the blue laser light to the exit lens 51.

Exemplarily, the fluorescence converter 4 is disposed on a focal plane of the focusing lens 7, and the orthographic projection of the first region 311 on the focusing lens 7 and the orthographic projection of the second region 312 on the focusing lens 7 are symmetrical with respect to the optical axis of the focusing lens 7, which can ensure that the blue laser light emitted from the first region 311, after passing through the focusing lens 7, is incident on a position of the fluorescence converter 4 that is located at the focal point of the focusing lens 7 and passes through the optical axis of the focusing lens 7. Thus, the blue laser light, after being reflected by the laser emission region 412, is incident to a position symmetric with the first region 311, and therefore the blue laser light is reflected to the second region 312 accurately.

The embodiments of the present disclosure are described by way of example where the first region 311 and the second region 312 are two independent regions sequentially arranged in the dichroic mirror 3. Exemplarily, the first region 311 and the second region 312 may also include a plurality of sub-regions that are spaced apart, and each sub-region in the first region 311 corresponds to a sub-region in the second region 312. The blue laser light transmitted from one sub-region in the first region 311, after being reflected by the laser emission region 412 of the fluorescence converter 4, is incident to a corresponding sub-region in the second region 312, and then is reflected by the sub-region to the exit lens 51. The two corresponding sub-regions are symmetric with respect to the optical axis of the focusing lens 7, and different sub-regions in the first region 311 are asymmetric with respect to the optical axis of the focusing lens 7. In this way, it can be ensured that the blue laser light emitted from the sub-region in the first region 311, after being reflected, is further reflected by the sub-region in the second region 312, and not transmitted through other sub-regions in the first region 311, thereby avoiding the waste of the blue laser light. This manner is not described in detail in the embodiments of the present disclosure.

Based on the implementation (1), referring to FIG. 1, one arrangement of the emission component 5 is that the emission component 5 is an exit lens 51. In this case, the fluorescence of the second waveband and the laser light of the second waveband are combined by the exit lens 51 and emitted from the exit lens 51, and the fluorescence of the third waveband and the laser light of the third waveband are combined by the exit lens 51 and emitted from the exit lens 51. Referring to FIG. 8, FIG. 13, or FIG. 14, another arrangement of the emission component 5 is that the emission component 5 includes an exit lens 51 and a color filter wheel 8.

FIG. 8 is a schematic structural diagram of another light source device based on the implementation (1). As shown in FIG. 8, which is a schematic diagram on the basis of the light source device 100 shown in FIG. 3, on the basis of any one of the above-described light source devices 100, the light source device 100 further includes a color filter wheel 8. The color filter wheel 8 is disposed on the light-output side of the exit lens 51, and light emitted from the exit lens 51 passes through the color filter wheel 8 and is emitted for subsequent usage. The structure of the color filter wheel 8 may be similar to the structure of the fluorescence converter 4 in the form of the fluorescent wheel. The color filter wheel 8 includes a light filter region and a transmission region. The light filter region is similar to the fluorescence conversion region 411 of the fluorescence converter 4, and the transmission region is similar to the laser emission region 412 of the fluorescence converter 4. The structure and division of the color filter wheel 8 can be referred to in the above description of the fluorescence converter 4.

Figure 9:
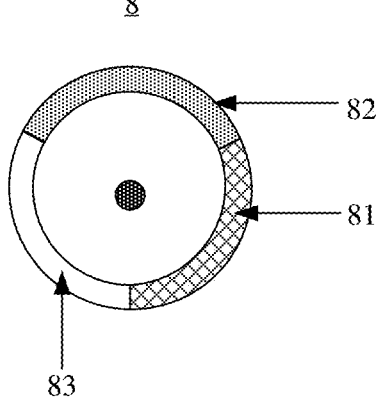
FIG. 9 is a schematic structural diagram of an exemplary color filter wheel according to some embodiments of the present disclosure.

Exemplarily, FIG. 9 is a schematic structural diagram of a color filter wheel according to some embodiments of the present disclosure. As shown in FIG. 9, the color filter wheel 8 includes a first light filter region 81, a second light filter region 82, and a transmission region 83. The color filter wheel is configured to rotate such that different regions receive the light emitted from the exit lens 51.

The first light filter region 81 filters color for the target fluorescence to obtain the fluorescence of the second waveband, and the fluorescence of the second waveband and the laser light of the second waveband are combined by the first light filter region 81 and emitted from the first light filter region 81. The second light filter region 82 is configured to receive the target fluorescence and the laser light of the third waveband from the exit lens 51, and the second light filter region 82 filters color for the target fluorescence to obtain the fluorescence of the third waveband, and the fluorescence of the third waveband and the laser light of the third waveband are combined by the second light filter region 82 and emitted from the second light filter region 82. The transmission region 83 is configured to receive the laser light of the first waveband from the exit lens 51.

For example, the laser light of the first waveband is blue laser light, the laser light of the second waveband is red laser light, the laser light of the third waveband is green laser light, the fluorescence of the second waveband is red fluorescence, and the fluorescence of the third waveband is green fluorescence light. The first light filter region 81 is configured to filter light for the red fluorescence and the red laser light from the exit lens 51 and then emit the filtered light, the second light filter region 82 is configured to filter the green fluorescence and the green laser light from the exit lens 51 and then emit the filtered light, and the transmission region 83 of the color filter wheel is configured to transmit the blue laser light from the exit lens 51.

For the rotation of the color filter wheel 8, reference may be made to the above description of the rotation of the fluorescence converter 4, which is not repeated in the present disclosure.

The rotation of the color filter wheel 8 and the rotation of the fluorescence converter 4 match the light-emitting time sequence of the second laser light source group 2. As the size of the light source device 100 is small, the transmission time of the laser light between different components of the light source device 100 is very short, and the transmission time is not taken into consideration in the embodiments of the present disclosure.

When the second laser light source group 2 emits the red laser light and the green laser light, the fluorescence converter 4 rotates such that the fluorescence conversion region 411 receives the blue laser light emitted from the focusing lens 7. When the second laser light source group 2 emits the red laser light, the color filter wheel 8 rotates such that the first light filter region 81 receives the light emitted from the exit lens 51. When the second laser light source group 2 emits the green laser light, the color filter wheel 8 rotates such that the second light filter region 82 receives the light emitted from the exit lens 51.

In this way, when the second laser light source group 2 emits the red laser light, the red laser light is transmitted to the first light filter region 81, and the target fluorescence (e.g., yellow fluorescence) excited in the fluorescence conversion region 411 is also is incident to the first light filter region 81 and is filtered by the first light filter region 81 to obtain the red fluorescence and the red fluorescence is emitted out. In this way, the red laser light and the red fluorescence are combined at the first light filter region 81 and emitted from the first light filter region 81.

Similarly, when the second laser light source group 2 emits the green laser light, the target fluorescence (e.g., yellow fluorescence) excited in the fluorescence conversion region 411 is incident to the second light filter region 82 and is filtered to obtain the green fluorescence, and the green fluorescence is emitted. In this way, the green laser light and the green fluorescence are combined at the second light filter region 82 and emitted from the second light filter region 82.

Exemplarily, the fluorescence conversion region 411 of the fluorescence converter 4 includes a fluorescence region of a first color and a fluorescence region of a second color. By way of example where the first color is red and the second color is green, when the second laser light source group 2 emits the laser light of the first color, the fluorescence converter 4 rotates such that the fluorescence region of the first color receives the blue laser light emitted from the focusing lens 7, and the color filter wheel 8 rotates such that the first light filter region 81 receives the light emitted from the exit lens 51. When the second laser light source group 2 emits the laser light of the second color, the fluorescence converter 4 rotates such that the fluorescence region of the second color receives the blue laser light emitted from the focusing lens 7, and the color filter wheel 8 rotates such that the second light filter region 82 receives the light emitted from the exit lens 51. The excited fluorescence in the fluorescence region has a wide wavelength range (e.g., the wavelength is in the range of plus or minus 30 nanometers of the central wavelength), and the fluorescence has a lower purity. In the embodiments of the present disclosure, the fluorescence of the first color emitted from the fluorescence region of the first color is filtered by the first light filter region 81, and the fluorescence of the second color emitted from the fluorescence region of the second color is filtered by the second light filter region 82, which can narrow the wavelength range of the emitted fluorescence and improve the purity of the fluorescence. For example, the wavelength of the fluorescence after being filtered by the light filter region is in the range of plus or minus 10 nanometers of the central wavelength.

When the fluorescence converter 4 rotates such that the laser emission region 412 receives the blue laser light emitted from the focusing lens 7, the color filter wheel 8 rotates such that the transmission region 83 receives the light emitted from the exit lens 51. In this way, the emission of the blue laser light from the transmission region 83 is realized.

It is not excluded that the second laser light source group 2 may also emit the blue laser light, that is, the laser light of the plurality of colors emitted from the second laser light source group 2 also includes the blue laser light, and the central wavelength of the blue laser light of the laser light of the plurality of colors is different from the central wavelength of the blue laser light emitted from the first laser light source group 1.

When the second laser light source group 2 emits the blue laser light, the fluorescence converter 4 rotates such that the laser emission region 412 receives the blue laser light emitted from the focusing lens 7, and the color filter wheel 8 rotates such that the transmission region 83 receives the light emitted from the exit lens 51. In this way, the blue laser light from the second laser light source group 2 and the blue laser light from the first laser light source group 1 are combined in the transmission region 83 of the color filter wheel 8 and emitted from the transmission region 83, and the brightness of the blue laser light forming the projection image can be improved.

Exemplarily, the light-output surface of the color filter wheel 8 may also be provided with a diffusion film. The diffusion film can homogenize the light filtered by the color filter wheel 8 and then emit the homogenized light, which can further weaken the speckle effect in the projection image formed of the light, and improve the display effect of the projection image.

On the basis of the light source device 100 described in the above implementation (1), as shown in FIG. 14, the light source device 100 further includes a homogenizing component 20. The homogenizing component 20 is disposed on light-output sides of the first laser light source group 1 and the second laser light source group 2, and disposed between the first laser light source group 1 and the second laser light source group 2 and the dichroic mirror 3. The homogenizing component 20 is configured to homogenize the light emitted from the first laser light source group 1 and the second laser light source group 2 and then emit it to the subsequent optical path.

In some embodiments, the homogenizing component 20 is a diffusion sheet or a compound eye. In the embodiments of the present disclosure, the diffusion sheet includes a first diffusion sheet 16 and a second diffusion sheet 17. The first diffusion sheet 16 is disposed between the first laser light source group 1 and the dichroic mirror 3, and the blue laser light emitted from the first laser light source group 1 is diffused by the first diffusion sheet 16 and then emitted to the dichroic mirror 3. The second diffusion sheet 17 is disposed on the light-output side of the second laser light source group 2, and the laser light of the plurality of colors emitted from the second laser light source group 2 is diffused by the second diffusion sheet 17 and then emitted to the dichroic mirror 3.

As shown in FIG. 14, the light source device 100 further includes a shaping lens group 18 and a light-combining lens group 19. The shaping group 18 is configured to shape the received blue laser light and then emit the shaped blue laser light to the dichroic mirror 3. The light-combining lens group 19 is configured to enable emitting positions of the laser light of at least two colors in the laser light of the plurality of colors emitted from the second laser light source group 2 to be close to each other.

In the embodiments of the present disclosure, the shaping lens group 18 is a beam-shrinking lens shape. The beam-shrinking lens shape is shrink the received blue laser light and then emit the shrunk blue laser light to the dichroic mirror 3.

FIG. 13 is a schematic structural diagram of another light source device based on implementation (1). As shown in FIG. 13, on the basis of any one of the light source devices 100 described above, FIG. 13 illustrates a light source device on the basis of the light source device 100 shown in FIG. 8. The light source device 100 further includes a light-combining lens group 19, and the light-combining lens group 19 is disposed on the light-output side of the second laser light source group 2. The laser light of the plurality of colors emitted from the second laser light source group 2 is incident to the light-combining lens group 19, and the light-combining lens group 19 enables emitting positions of the laser light of at least two colors in the laser light of the plurality of colors to be close to each other, so as to combine the laser light of the plurality of colors and emit the combined light. In this way, the light spots of the laser light of the at least two colors overlap to a higher degree, and the at least two color components are the distributed more uniformly in the projection image formed of the laser light of the at least two colors. Exemplarily, the optical axis of the light-combining lens group 19 is co-linear with the optical axis of the exit lens 51.

Exemplarily, the light-combining lens group 19 includes two light-combining lenses. The laser light of the first color and the laser light of the second color emitted from the second laser light source group 2 are incident to the two light-combining lenses, respectively, and one light-combining lens reflects the laser light (e.g., the second-colored laser light) incident thereto to the other light-combining lens, which is a dichroic mirror. The other light-combining lens reflects the laser light (e.g., the laser light of the first color) received from the second laser light source group 2 and transmits the laser light (e.g., the laser light of the second color) received from the light-combining lens, thereby achieving the combination and emission of the laser light of the first color and the laser light of the second color. The emission position of the laser light of the first color coincides with the emission position of the laser light of the second color coincide on the light-combining lens group 19.

Exemplarily, the polarization direction of the laser light of the first color and the polarization direction of the laser light of the second color are perpendicular. In the embodiments of the present disclosure, a half-wave plate may also be provided on the transmission path of the laser light of the first color or the laser light of the second color to rotate the polarization of either of the laser light of the first color and the laser light of the second color by 90 degrees, so as to make the polarization direction of the laser light of the first color and the polarization direction of the laser light of the second color the same, thereby improving the display effect of the projection image formed subsequently.

Exemplarily, the light source device 100 further includes a first diffusion sheet 16 disposed between the first laser light source group 1 and the dichroic mirror 3, and the blue laser light emitted from the first laser light source group 1 is diffused by the first diffusion sheet 16 and then incident to the dichroic mirror 3.

Exemplarily, the light source device 100 further includes a second diffusion sheet 17 disposed on the light-output side of the second laser light source group 2, and the laser light of the plurality of colors emitted from the second laser light source group 2 is diffused by the second diffusion sheet 17 and then incident to the dichroic mirror 3.

Exemplarily, the light source device 100 further includes a beam-shrinking lens group 18. The blue laser light emitted from the first laser light source group 1 is incident to the beam-shrinking lens group 18, and the beam-shrinking lens group 18 is configured to shrink the received blue laser light and then emit the shrunk light to the dichroic mirror 3.

FIG. 14 is a schematic structural diagram of another light source device based on implementation (1). As shown in FIG. 14, on the basis of any one of the light source devices 100 described above, FIG. 14 illustrates a light source device on the basis of the light source device 100 shown in FIG. 8. The light source device 100 further includes a beam-shrinking lens group 18, a first diffusion sheet 16, and a second diffusion sheet 17. The first laser light source group 1, the beam-shrinking lens group 18, the first diffusion sheet 16, and the dichroic mirror 3 are sequentially arranged along the first direction. The beam-shrinking lens group 18 includes a convex lens and a concave lens, and the beam-shrinking lens group 18 shrinks the blue laser light emitted from the first laser light source group 1 and then emits the shrunk light. The blue laser light emitted from the beam-shrinking lens group 18 is diffused by the first diffusion sheet 16, passes through the dichroic mirror 3, and then irradiates the fluorescence converter 4. As the laser light emitted from the laser is Gaussian light with the highest energy in the center region and lower energy in the edge region, the power density of the laser light irradiating the fluorescence converter 4 is too high, and consequently, the laser light has a lower fluorescence excitation efficiency on the fluorescence conversion region 411 of the fluorescence converter 4. In the embodiments of the present disclosure, the blue laser light is homogenized by the first diffusion sheet 16 and then is used for exciting the fluorescence conversion region 411 of the fluorescence converter 4 to emit fluorescence, and the energy distribution is more uniform at various positions of the region irradiated by the blue laser light, which can improve the fluorescence excitation efficiency.

The second diffusion sheet 17 is disposed between the second laser light source group 2 and the dichroic mirror 3. The laser light emitted from the second laser light source group 2 is diffused and homogenized by the second diffusion sheet 17 and then transmitted. In this way, it can be ensured that the light emitted from the light source device has a high uniformity, which further plays an effect of dissipating spots on the formed projection image.

Referring to FIG. 14, the light source device 100 further includes a second beam homogenizer 10 disposed on the light-output side of the color filter wheel 8. The second beam homogenizer 10 is configured to homogenize the light emitted from the color filter wheel 8 and then emit it to a subsequent light path, such that the light emitted from the light source device can be used subsequently.

In summary, for the light source device provided in the above-described implementation (1), the blue laser is used for exciting the fluorescence region of the fluorescent wheel to emit fluorescence, and then a projection image is formed of the blue laser light emitted from the first laser light source group 1, the fluorescence emitted from the fluorescence converter 4 in the form of the fluorescent wheel, and the laser light of the plurality of colors emitted from the second laser light source group 2. As the fluorescence is not coherent, in the projection image formed of the fluorescence combined with the laser light, the overall coherence of the light forming the projection image can be reduced and the speckle effect in the projection image can be weakened. Moreover, the second laser light source group also provides the required laser light of the plurality of colors for forming the projection image, which can ensure the high luminance and high color saturation of the formed projection image. Therefore, the display effect of the projection image formed of the light emitted from the light source device is better.

In some implementations (2), referring to FIG. 17, FIG. 24 to FIG. 27, and FIG. 29, the light-output path of the light source device 100 is the second light-output path, and the second light-output path includes: a path of the light beam of the laser light of the first waveband that is emitted separately along which the laser light of the first waveband is emitted via the dichroic mirror 3, the fluorescence converter 4, the dichroic mirror 3, and the exit lens 51; a path of the light beam of the laser light of the second waveband and the fluorescence of the second waveband that are combined and emitted along which the laser light of the second waveband passes through the dichroic mirror 3, the fluorescence converter 4, the dichroic mirror 3, and the exit lens 51, and is combined with the fluorescence of the second waveband at the emission component 5 and then is emitted from the emission component 5; a path of the laser light of the third waveband and the fluorescence of the third waveband that are combined and emitted along which the laser light of the third waveband passes through the dichroic mirror 3, the fluorescence converter 4, the dichroic mirror 3, the exit lens 51, and is combined with the fluorescence of the third waveband at the emission component 5 and then is emitted from the emission component 5.

In this case, as shown in FIG. 17, the dichroic mirror 3 includes a first portion 321, a second portion 322, a third portion 323, and a fourth portion 324 sequentially arranged side by side. The second portion 322 is disposed on the light-output path of the first laser light source group 1, and the fourth portion 324 is disposed on the light-output path of the second laser light source group 2. The second portion 322 is configured to transmit the laser light of the first waveband, the fourth portion 324 is configured to at least transmit the laser light of the second waveband and the laser light of the third waveband, and the first portion 321 and the third portion 323 are configured to reflect the laser light of the first waveband, the laser light of the second waveband, or the laser light of the third waveband and the fluorescence.

By way of example where the laser light of the first waveband is blue laser light, the laser light of the second waveband is red laser light, and the laser light of the third waveband is green laser light, the second portion 322 is disposed on the light-output path of the first laser light source group 1, and the second portion 322 is configured to transmit the blue laser light; the fourth portion 324 is disposed on the light-output path of the second laser light source group 2, and the fourth portion 324 is configured to transmit the red laser light and the green laser light; and the first portion 321 and the third portion 323 are configured to reflect the blue laser light, the laser light of a plurality of colors and the fluorescence, thereby adapting to the second light-output path described above.

The fluorescence emitted under excitation by the fluorescence conversion component 422, the reflected red laser light/green laser light, and the reflected blue laser light are all reflected by the first portion 321 and the third portion 323 in the set direction, thereby achieving the emission of three basic colors of light.

Figure 29:
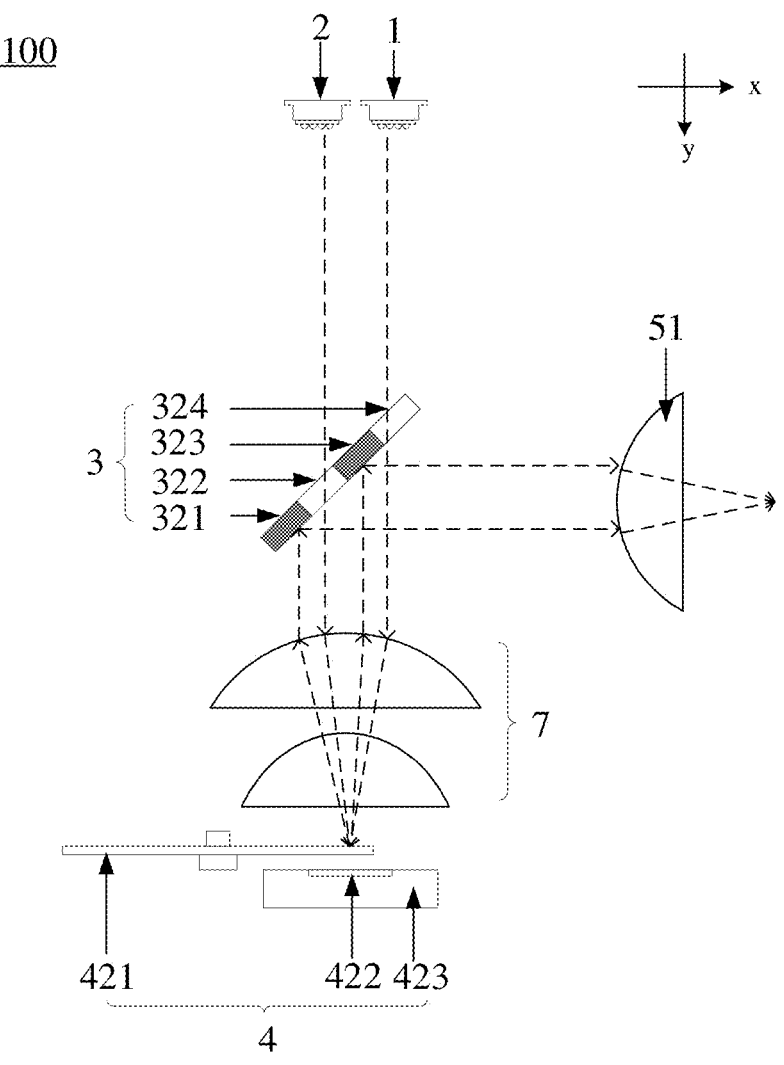
FIG. 29 shows a schematic structural diagram of a fourteenth exemplary light source device according to some embodiments of the present disclosure.

Based on the second light-output path mentioned above, as shown in FIG. 17 and FIG. 29, the first laser light source group 1 and the second laser light source group 2 are arranged side-by-side, such that the light-output directions of the first laser light source group 1 and the second laser light source group 2 are parallel to each other. Further, FIG. 17 shows that the first laser light source group 1 and the second laser light source group 2 are integrally arranged to form a laser light source array. FIG. 29 shows that the first laser light source group 1 and the second laser light source group 2 are arranged independently of each other.

As shown in FIG. 17, the laser light source array consisting of the first laser light source group 1 and the second laser light source group 2, the dichroic mirror 3, the focusing lens 7, and the fluorescence converter 4 are arranged sequentially along the first direction (e.g., the x direction). The dichroic mirror 3 and the exit lens 51 are arranged sequentially along the second direction (e.g., the y direction). The first direction intersects the second direction, and the embodiments of the present disclosure are illustrated by taking an example where the first direction is perpendicular to the second direction.

As shown in FIG. 17, the light source device 100 further includes a first reflector 11 and a second reflector 12. The first reflector 11 is disposed on the light-output side of the first laser light source group, and the first reflector 11 is configured to reflect the blue laser light emitted from the first laser light source group 1 to the second portion 322. The second reflector 12 is disposed on the light-output side of the second laser light source group, and the second reflector 12 is configured to reflect the laser light of the plurality of colors emitted from the second laser light source group 2 to the fourth portion 324.

The laser beams emitted from the first laser light source group 1 and the second laser light source group 2 may be regarded as a laser spot when they are incident on the corresponding reflectors. Therefore, the size of the first reflector 11 and the size of the second reflector 12 need to be greater than the size of the incident laser spot. By setting the first reflector 11 and the second reflector 12 at suitable angles, the blue laser light emitted from the first laser light source group 1 can be incident to the second portion 322 after being reflected by the first reflector 11, and the red laser light and green laser light emitted from the second laser light source group 2 can be incident to the fourth portion 324 after being reflected by the second reflector 12.

Based on implementation (1), the fluorescence converter 4 may adopt the fluorescence converter 4 including the fluorescent wheel and the light selection layer 413 (referring to FIG. 27 and FIG. 28), and may also adopt the fluorescence converter 4 including the dynamic optical component 421, the fluorescence conversion component 422, and the heat dissipation component 423 (referring to FIG. 17).

The following descriptions are provided by way of example where the fluorescence converter 4 only includes the dynamic optical component 421, the fluorescence conversion component 422, and the heat dissipation component 423. The fluorescence conversion layer 4221 of the fluorescence conversion component 422 is configured to emit yellow fluorescence under the excitation of the blue laser light. The transmission portion 4212 of the dynamic optical component 421 includes a first light filter portion 42121 and a second light filter portion 42122, the first light filter portion 42121 is configured to transmit light of the first waveband and the second waveband and reflect light of the third waveband, and the second light filter portion 42122 is configured to transmit light of the first waveband and the third waveband and reflect light of the second waveband. The first waveband includes a blue waveband, the second waveband includes a red waveband, and the third waveband includes a green waveband.

Based on implementation (2), referring to FIG. 17, one arrangement of the emission component 5 is that the emission component 5 is an exit lens 51. The fluorescence of the second waveband and the laser light of the second waveband are combined and emitted by the exit lens 51, and the fluorescence of the third waveband and the laser light of the third waveband are combined and emitted by the exit lens 51.

The working principle of the light source device 100 involved in implementation (2) is exemplarily illustrated with reference to FIG. 17. In FIG. 17, the focusing lens 7 is arranged between the dichroic mirror 3 and the dynamic optical component 421, and thus the focusing lens 7 is involved in the following descriptions, which does not exclude the technical solution in which the focusing lens 7 is not provided.

As shown in FIG. 17, when the dynamic optical component 421 is switched to the state where the reflection portion 4211 is opposite to the fluorescence conversion component 422, the first laser light source group 1 is started, and the blue laser light emitted from the first laser light source group 1 is incident into the dichroic mirror 3 (specifically, the second portion 322 of the dichroic mirror 3) after being reflected by the first reflector 11, and then irradiated onto the reflection portion 4211 of the dynamic optical component 421 after being focused by the focusing lens 7. The blue laser light incident onto the reflection portion 4211 is reflected to the dichroic mirror 3 (specifically, the third portion 323 of the dichroic mirror 3), and is emitted in the set direction after being reflected by the dichroic mirror 3.

When the dynamic optical component 421 is switched to the state where the first light filter portion 42121 is opposite to the fluorescence conversion component 422, the first laser light source group 1 and the second laser light source of the second laser light source group 2 are started simultaneously. The blue laser light emitted from the first laser light source group 1 is incident into the second portion 322 of the dichroic mirror after being reflected by the first reflector 11, and then irradiated onto the first light filter portion 42121 of the dynamic optical component 421 after being focused by the focusing lens 7. The red laser light emitted from the second laser light source group 2 is incident into the fourth portion 324 of the dichroic mirror after being reflected by the second reflector 12, and then irradiated onto the first light filter portion 42121 of the dynamic optical component 421 after being focused by the focusing lens 7.

The blue laser light passes through the first light filter portion 42121 and is irradiated onto the fluorescence conversion component 422 to excite the fluorescence conversion component 422 to emit fluorescence (e.g., yellow fluorescence), and red fluorescence is obtained after the fluorescence is reflected by the reflecting layer 4223 and filtered by the first light filter portion 42121. The red fluorescence is emitted to the dichroic mirror 3, and then the red fluorescence is reflected by the dichroic mirror 3 and emitted in the set direction. The anti-reflection layer 4222 has an anti-reflection effect on blue light and a reflection effect on red light and green light. After being reflected by the anti-reflection layer 4222, the red laser light passes through the first light filter portion 42121 and is emitted to the dichroic mirror 3, and then the red laser light is reflected by the dichroic mirror 3 and emitted together with the red fluorescence in the set direction.

When the dynamic optical component 421 is switched to the state where the second light filter portion 42122 is opposite to the fluorescence conversion component 422, the first laser light source group 1 and the third laser light source of the second laser light source group 2 are started simultaneously. The blue laser light emitted from the first laser light source group 1 is incident into the second portion 322 of the dichroic mirror after being reflected by the first reflector 11, and then irradiated onto the second light filter portion 42122 of the dynamic optical component 421 after being focused by the focusing lens 7. The green laser light emitted from the second laser light source group 2 is incident into the fourth portion 324 of the dichroic mirror after being reflected by the second reflector 12, and then irradiated onto the second light filter portion 42122 of the dynamic optical component 421 after being focused by the focusing lens 7.

The blue laser light passes through the second light filter portion 42122 and is irradiated on the fluorescence conversion component 422 to excite the fluorescence conversion component 422 to emit fluorescence (e.g., yellow fluorescence), and green fluorescence is obtained after the fluorescence is reflected by the reflecting layer 4223 and filtered by the second light filter portion 42122. The green fluorescence is emitted to the dichroic mirror 3, and then the green fluorescence is reflected by the dichroic mirror 3 and emitted in the set direction. After being reflected by the anti-reflection layer 4222, the green laser light passes through the second light filter portion 42122 and is emitted to the dichroic mirror 3, and then the green laser light is reflected by the dichroic mirror 3 and emitted together with the red fluorescence in the set direction.

FIG. 24 is a schematic structural diagram of another light source device based on implementation (2), and FIG. 24 shows a light source device on the basis of the light source device 100 shown in FIG. 17.

As shown in FIG. 24, the light source device further includes a first collimating lens 6 disposed between the first laser light source group 1 and/or the second laser light source group 2 and the dichroic mirror 3. The first collimating lens 6 is configured to collimate and shape the laser light emitted from the laser light source groups to reduce the size of the laser spot. The first collimating lens 6 includes at least one lens, and the first collimating lens 6 includes two lenses in the embodiments of the present disclosure.

Figure 25:
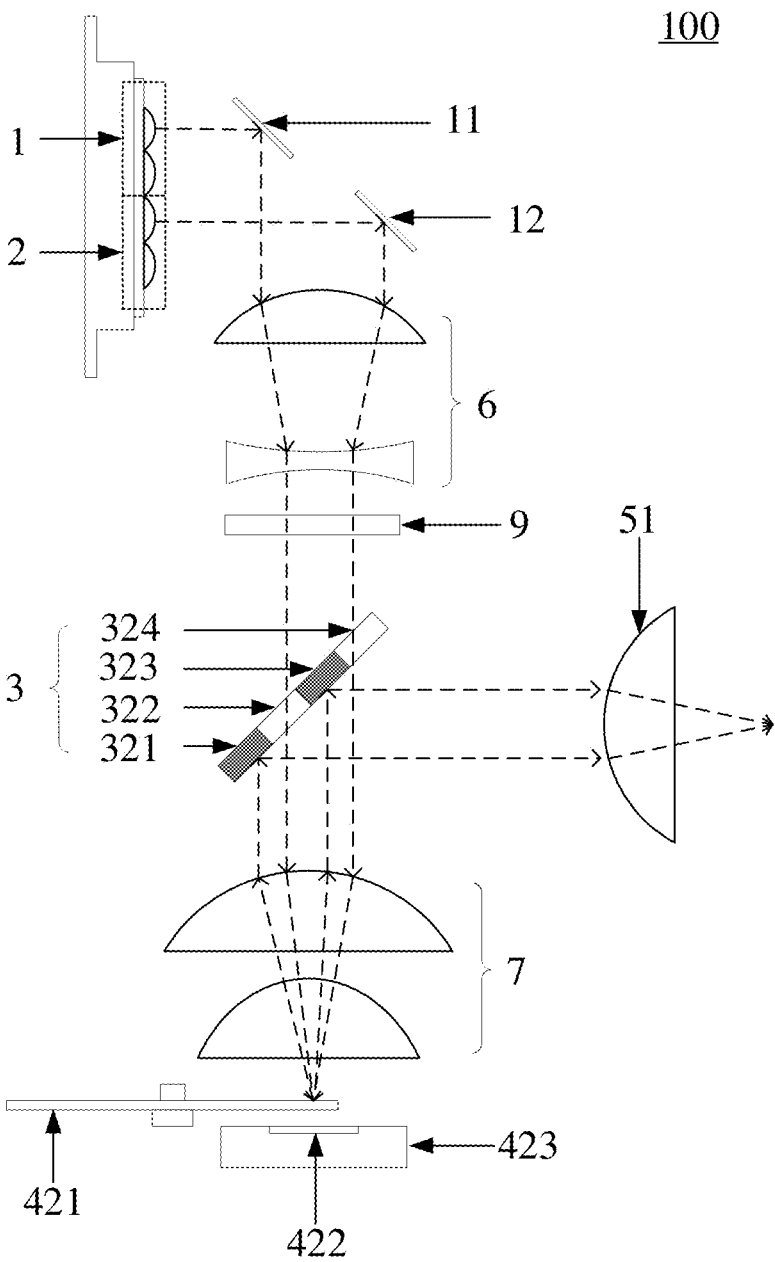
FIG. 25 is a schematic structural diagram of an eleventh exemplary light source device according to some embodiments of the present disclosure.

FIG. 25 is a schematic structural diagram of another light source device based on the implementation (2), and FIG. 25 shows a light source device on the basis of the light source device 100 shown in FIG. 24.

As shown in FIG. 25, the light source device 100 further includes a first beam homogenizer 9 disposed between the first collimating lens 6 and the dichroic mirror 3. The laser light emitted from the laser light source groups has high energy, and in order to avoid laser light speckle and avoid the fluorescence conversion efficiency from being reduced due to the too high energy of the laser light incident to the fluorescence conversion component, the first beam homogenizer 9 is provided on the light path to homogenize the laser light. For example, the first beam homogenizer 9 is a light homogenization layer.

Figure 26:
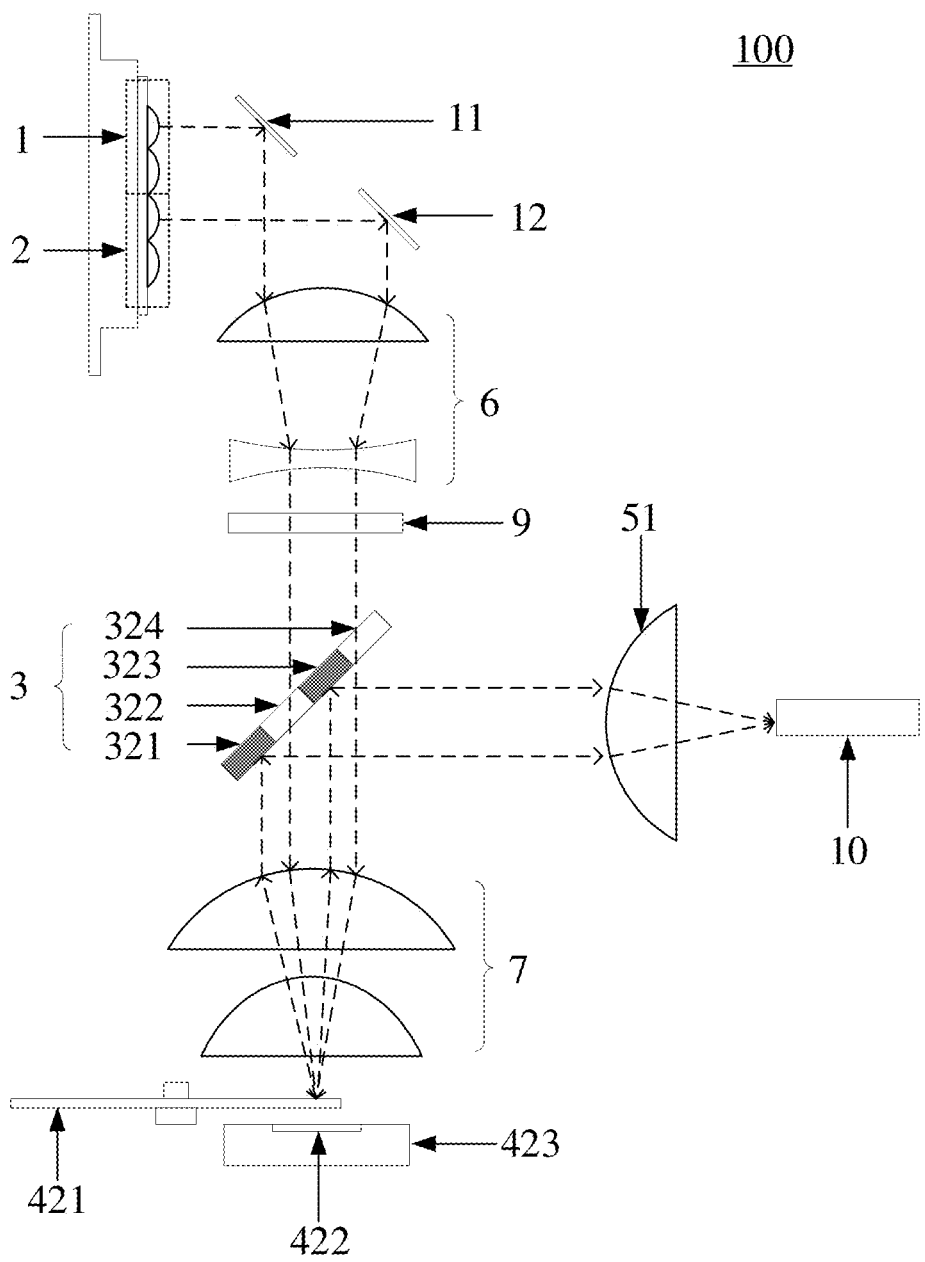
FIG. 26 is a schematic structural diagram of a twelfth exemplary light source device according to some embodiments of the present disclosure.

FIG. 26 is a schematic structural diagram of another light source device involved in implementation (2), and FIG. 26 shows a light source device on the basis of the light source device 100 shown in FIG. 25.

As shown in FIG. 26, the light source device 100 further includes a second beam homogenizer 10 disposed on the side of the exit lens 51 facing away from the dichroic mirror 3. For example, the second beam homogenizer 10 is a light stick, a light pipe, or the like.

The three basic colors of light emitted from the dichroic mirror 3 in a time sequence need to be further homogenized before being incident to a display component. Therefore, the second beam homogenizer 10 is provided at the light exit port of the light source device 100, and the exit lens 51 is provided in front of the second beam homogenizer 10, such that as much light as possible is incident to the second beam homogenizer 10 for usage.

Figure 30:
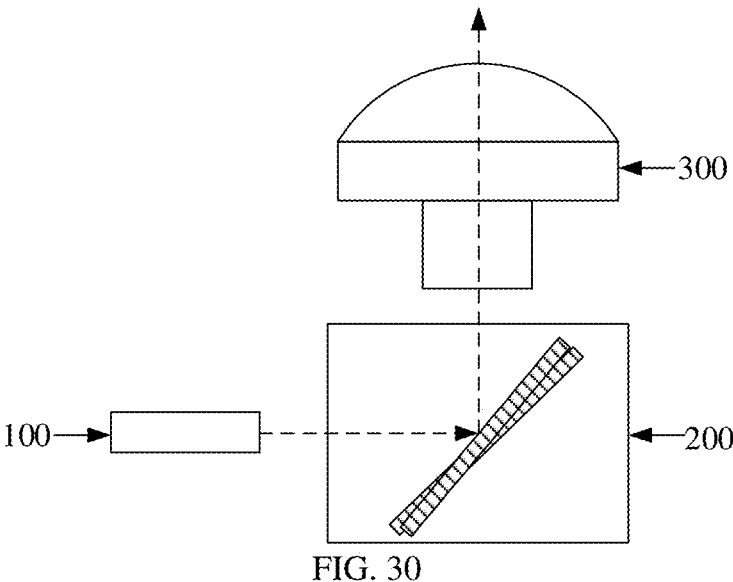
FIG. 30 is a schematic structural diagram of an exemplary projection system according to some embodiments of the present disclosure.

In another aspect, the embodiments of the present disclosure further provide a projection system. As shown in FIG. 30, the projection system includes any one of the above-described light source devices 100, an optical valve modulation component 200, and a projection lens 300. The optical valve modulation component 200 is disposed on the light-output side of the light source device 100, and the optical valve modulation component 200 is configured to modulate and emit the incident light. The projection lens 300 is disposed on the light-emitting path of the optical valve modulation component 200, and the projection lens 300 is configured to project an image of the light emitted from the optical valve modulation component 200.

The optical valve modulation component 200 is configured to modulate and reflect the incident light. In a specific implementation, the optical valve modulation component 200 may be a digital micromirror device (DMD). The surface of the DMD is provided with thousands of tiny reflectors, and each reflector may be individually driven to deflect and is configured to form a pixel in the projection image. The reflected light can be incident to the projection lens 300 by controlling the angle of deflection of the DMD. Based on the image to be displayed, the reflector corresponding to the pixel to be displayed in a bright state in the optical valve modulation component 200 reflects the laser light to the lens to achieve the modulation of the light.

The projection lens 300 includes a plurality of lenses (not shown in the figure). The laser light emitted from the optical valve modulation component 200 passes through the plurality of lenses in the projection lens 300 sequentially and is incident to a screen. In this way, the projection lens 300 achieves the projection of the laser light and achieves the display of the projection image.

The projection system provided in the embodiments of the present disclosure has all of the advantages of the light source devices 100 described above.

Described above are merely optional embodiments of the present disclosure, and are not intended to limit the present disclosure. Within the spirit and principles of the present disclosure, any modifications, equivalent substitutions, improvements, and the like are within the protection scope of the present disclosure.

The invention claimed is:

1. A light source device, comprising a first laser light source group, a second laser light source group, a dichroic mirror, a fluorescence converter, and an emission component; wherein the first laser light source group comprises a first laser light source, the first laser light source being configured to emit laser light of a first waveband; and the second laser light source group at least comprises a second laser light source and a third laser light source, the second laser light source being configured to emit laser light of a second waveband, and the third laser light source being configured to emit laser light of a third waveband;

the dichroic mirror is disposed on light-output sides of the first laser light source group and the second laser light source group, and the fluorescence converter and the emission component are respectively disposed on a light-output side of the dichroic mirror;

the dichroic mirror is configured to emit the laser light of the first waveband, the laser light of the second waveband, and the laser light of the third waveband, and the fluorescence converter is capable of generating target fluorescence under excitation of the laser light of the first waveband, wherein the target fluorescence is reflected by the dichroic mirror to the emission component, and the target fluorescence is capable of providing fluorescence of the second waveband and fluorescence of the third waveband; and the light source device comprises at least three light beams, wherein the at least three light beams are emitted from the emission component according to a time sequence, and the at least three light beams comprise the laser light of the first waveband which is emitted separately, the laser light of the second waveband and the fluorescence of the second waveband which are combined and emitted, and the laser light of the third waveband and the fluorescence of the third waveband which are combined and emitted;

wherein at least a partial region of the dichroic mirror has a transmittance greater than a first probability threshold to light with a wavelength within a target wavelength range, and has a transmittance less than a second probability threshold to light with a wavelength outside the target wavelength range, the first probability threshold being greater than the second probability threshold; wherein the wavelength within the target wavelength range meets a condition that an absolute value of a wavelength difference between the wavelength and a central wavelength of the laser light of the first waveband emitted from the first laser light source group is less than a wavelength difference threshold, or an absolute value of a wavelength difference between the wavelength and a central wavelength of either of the laser light of the second waveband and the laser light of the third waveband emitted from the second laser light source group is less than the wavelength difference threshold, wherein the wavelength difference threshold ranges from 3 nm to 10 nm.

2. The light source device according to claim 1, comprising a first light-output path, wherein the first light-output path comprises:

a path along which the laser light of the first waveband is emitted via the dichroic mirror, the fluorescence converter, the dichroic mirror, and the emission component;

a path along which the laser light of the second waveband passes through the dichroic mirror and the emission component, and is combined with a fluorescent light of the second waveband at the emission component and is emitted from the emission component; and a path along which the laser light of the third waveband passes through the dichroic mirror and the emission component, and is combined with the fluorescent light of the third waveband at the emission component and is emitted from the emission component.

3. The light source device according to claim 1, wherein the fluorescence converter is a fluorescent wheel, the fluorescent wheel comprising a fluorescence conversion region and a laser emission region; wherein the fluorescence conversion region is configured to emit the target fluorescence under excitation of laser light of the first waveband as received; and the laser emission region is configured to receive the laser light of the first waveband and emit the laser light of the first waveband in a transmission mode or a reflection mode.

4. The light source device according to claim 1, wherein the fluorescence converter comprises a fluorescent wheel and a light selection layer, the fluorescent wheel comprising a fluorescence conversion region and a laser emission region; wherein the fluorescence conversion region is configured to provide the target fluorescence under excitation of laser light of the first waveband as received;

the laser emission region is configured to receive the laser light of the first waveband and emit the laser light of the first waveband in a transmission mode or a reflection mode; and the light selection layer is disposed on a surface of the fluorescent wheel facing the dichroic mirror, and the light selection layer meets conditions of transmitting laser light of the first waveband and target fluorescence, and reflecting laser light of the second waveband and laser light of the third waveband.

5. The light source device according to claim 1, wherein the fluorescence converter comprises a dynamic optical component, a fluorescence conversion component, and a heat dissipation component; wherein the dynamic optical component comprises a reflection portion and a transmission portion that are dynamically switchable, the reflection portion being configured to reflect laser light of the first waveband, and the transmission portion being configured to transmit light;

the fluorescence conversion component is disposed on a light-output side of the dynamic optical component, and the fluorescence conversion component is configured to emit the target fluorescence under excitation of laser light of the first waveband as received; and the heat dissipation component is disposed on a side of the fluorescence conversion component facing away from the dynamic optical component, and the heat dissipation component is configured to dissipate heat from the fluorescence conversion component.

6. The light source device according to claim 5, wherein the fluorescence conversion component comprises a fluorescence conversion layer, an anti-reflection layer, and a reflection layer; wherein the fluorescence conversion layer is configured to emit the target fluorescence under the excitation of the laser light of the first waveband;

the anti-reflection layer is disposed on a side of the fluorescence conversion layer facing the dynamic optical component, and the anti-reflection layer meets conditions of transmitting laser light of the first waveband and target fluorescence, and reflecting laser light of the second waveband and laser light of the third waveband;

the reflection layer is disposed on a side of the fluorescence conversion layer facing away from the anti-reflection layer, and the reflection layer is configured to reflect the target fluorescence; and the anti-reflection layer is configured to anti-reflect the laser light of the first waveband.

7. The light source device according to claim 6, wherein the fluorescence conversion component further comprises a heat conduction layer and a connection layer; wherein the heat conduction layer is disposed on a side of the reflection layer facing away from the fluorescence conversion layer; and the connection layer is disposed on a side of the heat conduction layer facing away from the reflection layer, and the connection layer is configured to be connected to the heat dissipation component.

8. The light source device according to claim 6, wherein the transmission portion comprises a first light filter portion and a second light filter portion; wherein the first light filter portion is configured to transmit light of the first waveband and light of the second waveband, and reflect light of the third waveband; and the second light filter portion is configured to transmit the light of the first waveband and the light of the third waveband, and reflect the light of the second waveband;

wherein the first waveband comprises a blue waveband, the second waveband comprises a red waveband, and the third waveband comprises a green waveband; wherein the laser light of the first waveband is blue laser light, the laser light of the second waveband is red laser light, and the laser light of the third waveband is green laser light; and the fluorescence of the second waveband is red fluorescence, and the fluorescence of the third waveband is green fluorescence.

9. The light source device according to claim 1, wherein the emission component comprises an exit lens and a color filter wheel; wherein the color filter wheel comprises a first light filter region, a second light filter region, and a transmission region, and the color filter wheel is configured to rotate such that different regions receive light emitted from the exit lens; wherein the first light filter region is configured to receive target fluorescence and laser light of the second waveband from the exit lens, and configured to filter color for the target fluorescence to obtain fluorescence of the second waveband, wherein the fluorescence of the second waveband and the laser light of the second waveband are combined and emitted from the first light filter region;

the second light filter region is configured to receive the target fluorescence and laser light of the third waveband from the exit lens, and configured to filter color for the target fluorescence to obtain fluorescence of the third waveband, and the fluorescence of the third waveband and the laser light of the third waveband are combined and emitted from the second light filter region; and the transmission region is configured to receive laser light of the first waveband from the exit lens.

10. The light source device according to claim 1, wherein the light source device comprises a first light-output path, and the light source device further comprises a light path adjusting lens group and a second collimating lens; wherein the second collimating lens is configured to collimate laser light of the first waveband from the fluorescence converter and emit the laser light of the first waveband to the light path adjusting lens group; and the light path adjusting lens group is configured to emit laser light of the first waveband as received to the dichroic mirror, and the dichroic mirror is configured to transmit laser light of the first waveband from the light path adjusting lens group to the emission component.

11. The light source device according to claim 10, further comprising a homogenizing component, wherein the homogenizing component is disposed on the light-output sides of the first laser light source group and the second laser light source group, and disposed between the first laser light source group and the second laser light source group and the dichroic mirror.

12. The light source device according to claim 11, wherein the homogenizing component is a diffusion sheet or a compound eye;

in a case that the homogenizing component is the diffusion sheet, the diffusion sheet comprising a first diffusion sheet and a second diffusion sheet;

wherein the first diffusion sheet is disposed between the first laser light source group and the dichroic mirror, and the laser light of the first waveband emitted from the first laser light source group is diffused by the first diffusion sheet and emitted to the dichroic mirror;

the second diffusion sheet is disposed on the light-output side of the second laser light source group, and the laser light of the second waveband emitted from the second laser light source group is diffused by the second diffusion sheet and emitted to the dichroic mirror.

13. The light source device according to claim 10, further comprising a shaping lens group and a light-combining lens group; wherein the shaping lens group is configured to shape laser light of the first waveband as received and emit the laser light of the first waveband to the dichroic mirror; and the light-combining lens group is configured to enable emitting positions of the laser light of the second waveband and the laser light of the third waveband emitted from the second laser light source group to be close to each other.

14. The light source device according to claim 1, wherein the light source device comprises a first light-output path, and the dichroic mirror comprises a first region and a second region; wherein the first region is configured to receive the laser light of the first waveband from the first laser light source group and transmit the laser light of the first waveband to the fluorescence converter;

the second region is configured to receive laser light of the first waveband from the first region and reflect the laser light of the first waveband to the emission component; and the first region and the second region are further configured to transmit the laser light of the second waveband or the laser light of the third waveband from the second laser light source group to the emission component.

15. The light source device according to claim 1, comprising a second light-output path;

the dichroic mirror comprises a first portion, a second portion, a third portion, and a fourth portion sequentially arranged side by side, wherein the second portion is disposed on a light-output path of the first laser light source group, and the fourth portion is disposed on a light-output path of the second laser light source group; and the second portion is configured to transmit the laser light of the first waveband, the fourth portion is configured to at least transmit the laser light of the second waveband and the laser light of the third waveband, and the first portion and the third portion are configured to reflect the laser light of the first waveband, the laser light of the second waveband or the laser light of the third waveband, and the fluorescence.

16. The light source device according to claim 15, wherein the fluorescence converter comprises a dynamic optical component, a fluorescence conversion component, and a heat dissipation component; wherein a fluorescence conversion layer of the fluorescence conversion component is configured to emit yellow fluorescence under the excitation of the laser light of the first waveband; and a transmission portion of the dynamic optical component comprises a first light filter portion and a second light filter portion, wherein the first light filter portion is configured to transmit light of the first waveband and light of the second waveband and reflect light of the third waveband; and the second light filter portion is configured to transmit the light of the first waveband and the light of the third waveband and reflect the light of the second waveband;

wherein the first waveband comprises a blue waveband, the second waveband comprises a red waveband, and the third waveband comprises a green waveband.

17. The light source device according to claim 1, further comprising at least one of a first collimating lens, a focusing lens, a first beam homogenizer, or a second beam homogenizer; wherein the first collimating lens is disposed between at least one of the first laser light source group or the second laser light source group and the dichroic mirror;

the focusing lens is disposed between the dichroic mirror and the fluorescence converter;

the first beam homogenizer is disposed between at least one of the first laser light source group or the second laser light source group and the dichroic mirror, or disposed between the first collimating lens and the dichroic mirror; and the second beam homogenizer is disposed on a light-output side of the emission component.

18. A projection system, comprising a light source device, an optical valve modulation component, and a projection lens; wherein the optical valve modulation component is disposed on a light-output side of the light source device and is configured to modulate and emit incident light;

the projection lens is disposed on a light-emitting path of the optical valve modulation component and is configured to project an image of light emitted from the optical valve modulation component;

the light source device comprises a first laser light source group, a second laser light source group, a dichroic mirror, a fluorescence converter, and an emission component; wherein the first laser light source group comprises a first laser light source, the first laser light source being configured to emit laser light of a first waveband; and the second laser light source group at least comprises a second laser light source and a third laser light source, the second laser light source being configured to emit laser light of a second waveband, and the third laser light source being configured to emit laser light of a third waveband;

the dichroic mirror is disposed on light-output sides of the first laser light source group and the second laser light source group, and the fluorescence converter and the emission component are respectively disposed on a light-output side of the dichroic mirror;

the dichroic mirror is configured to emit the laser light of the first waveband, the laser light of the second waveband, and the laser light of the third waveband, and the fluorescence converter is capable of generating target fluorescence under excitation of the laser light of the first waveband, wherein the target fluorescence is reflected by the dichroic mirror to the emission component, and the target fluorescence is capable of providing fluorescence of the second waveband and fluorescence of the third waveband; and the light source device comprises at least three light beams, wherein the at least three light beams are emitted from the emission component according to a time sequence, and the at least three light beams comprise the laser light of the first waveband which is emitted separately, the laser light of the second waveband and the fluorescence of the second waveband which are combined and emitted, and the laser light of the third waveband and the fluorescence of the third waveband which are combined and emitted;

wherein at least a partial region of the dichroic mirror has a transmittance greater than a first probability threshold to light with a wavelength within a target wavelength range, and has a transmittance less than a second probability threshold to light with a wavelength outside the target wavelength range, the first probability threshold being greater than the second probability threshold; wherein the wavelength within the target wavelength range meets a condition that an absolute value of a wavelength difference between the wavelength and a central wavelength of the laser light of the first waveband emitted from the first laser light source group is less than a wavelength difference threshold, or an absolute value of a wavelength difference between the wavelength and a central wavelength of either of the laser light of the second waveband and the laser light of the third waveband emitted from the second laser light source group is less than the wavelength difference threshold, wherein the wavelength difference threshold ranges from 3 nm to 10 nm.

19. A light source device, comprising a first laser light source group, a second laser light source group, a dichroic mirror, a fluorescence converter, and an emission component; wherein the first laser light source group comprises a first laser light source, the first laser light source being configured to emit laser light of a first waveband; and the second laser light source group at least comprises a second laser light source and a third laser light source, the second laser light source being configured to emit laser light of a second waveband, and the third laser light source being configured to emit laser light of a third waveband;

the dichroic mirror is disposed on light-output sides of the first laser light source group and the second laser light source group, and the fluorescence converter and the emission component are respectively disposed on a light-output side of the dichroic mirror;

the dichroic mirror is configured to emit the laser light of the first waveband, the laser light of the second waveband, and the laser light of the third waveband, and the fluorescence converter is capable of generating target fluorescence under excitation of the laser light of the first waveband, wherein the target fluorescence is reflected by the dichroic mirror to the emission component, and the target fluorescence is capable of providing fluorescence of the second waveband and fluorescence of the third waveband; and the light source device comprises at least three light beams, wherein the at least three light beams are emitted from the emission component according to a time sequence, and the at least three light beams comprise the laser light of the first waveband which is emitted separately, the laser light of the second waveband and the fluorescence of the second waveband which are combined and emitted, and the laser light of the third waveband and the fluorescence of the third waveband which are combined and emitted;

wherein the light source device comprises a second light-output path, wherein the second light-output path comprises:

a path along which the laser light of the first waveband is emitted via the dichroic mirror, the fluorescence converter, the dichroic mirror, and the emission component;

a path along which the laser light of the second waveband passes through the dichroic mirror, the fluorescence converter, the dichroic mirror, and the emission component, and is combined with the fluorescent light of the second waveband at the emission component and is emitted from the emission component; and a path along which the laser light of the third waveband passes through the dichroic mirror, the fluorescence converter, the dichroic mirror, and the emission component, and is combined with the fluorescent light of the third waveband at the emission component and is emitted from the emission component.

* * * * *